(12) United States Patent
Ou et al.

(10) Patent No.: US 12,741,454 B2
(45) Date of Patent: Sep. 22, 2026

(54) WATERPROOF, BREATHABLE NONWOVEN TEXTILES FOR ARTICLES AND METHODS OF MAKING THE SAME

(71) Applicant: NIKE, Inc., Beaverton, OR (US)

(72) Inventors: Yang-Hua Ou, Lake Oswego, OR (US); Christopher J. Ranalli, Portland, OR (US); Lai-Hung Wan, Taoyuan (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/763,958

(22) Filed: Jul. 3, 2024

(65) Prior Publication Data

US 2025/0010597 A1 Jan. 9, 2025

Related U.S. Application Data

(60) Provisional application No. 63/525,482, filed on Jul. 7, 2023.

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/022* (2013.01); *B32B 5/028* (2013.01); *B32B 37/12* (2013.01); *B32B 37/24* (2013.01); *B32B 38/08* (2013.01); *B32B 38/145* (2013.01); *D04H 1/56* (2013.01); *D06P 1/94* (2013.01); *B32B 2037/243* (2013.01); *B32B 2250/40* (2013.01); *B32B 2255/02* (2013.01); *B32B 2260/021* (2013.01); *B32B 2305/28* (2013.01); *B32B 2305/38* (2013.01); *B32B 2307/4026* (2013.01); *B32B 2307/718* (2013.01); *B32B 2307/724* (2013.01);
(Continued)

(58) Field of Classification Search
None
See application file for complete search history.

(56) References Cited

U.S. PATENT DOCUMENTS 6,936,330 B2 8/2005 Fereshtehkhou et al.
2002/0119288 A1 8/2002 Morman et al.
(Continued)

FOREIGN PATENT DOCUMENTS

DE 4344021 A1 * 6/1995 ................ D06P 1/16
JP 2014-073671 A 4/2014
(Continued)

OTHER PUBLICATIONS

Machine Translation via EPO of DE 4344021A1 (Year: 1995).*
(Continued)

*Primary Examiner* — Laura C Powers
(74) *Attorney, Agent, or Firm* — Shook, Hardy & Bacon L.L.P.

(57) ABSTRACT

A composite textile can include various layers, such as a nonwoven layer and a waterproof, breathable membrane. The composite textile can include various properties, such as waterproofness, water repellency, and the like. In addition, the composite textile can be manufactured using various techniques, which can be configured to impart desired properties. The composite textile can be suitable to form articles designed for inclement weather.

19 Claims, 8 Drawing Sheets

(51) Int. Cl.

| | |
|---|---|
| ***B32B 37/12*** | (2006.01) |
| ***B32B 37/24*** | (2006.01) |
| ***B32B 38/00*** | (2006.01) |
| ***B32B 38/08*** | (2006.01) |
| ***D04H 1/56*** | (2006.01) |
| ***D06P 1/94*** | (2006.01) |

(52) U.S. Cl.

CPC ... *B32B 2307/7265* (2013.01); *B32B 2437/00* (2013.01); *D10B 2401/021* (2013.01); *D10B 2501/00* (2013.01)

(56) References Cited

U.S. PATENT DOCUMENTS

| | | | |
|---|---|---|---|
| 2009/0208759 | A1 | 8/2009 | Kanagawa et al. |
| 2014/0072793 | A1 | 3/2014 | Asano et al. |
| 2014/0093687 | A1 | 4/2014 | Humiston et al. |
| 2016/0244880 | A1 | 8/2016 | Thompson et al. |
| 2017/0144406 | A1 | 5/2017 | Crotty |
| 2019/0374908 | A1 | 12/2019 | Chang |
| 2020/0187578 | A1 | 6/2020 | Sadato |
| 2022/0136157 | A1 | 5/2022 | Connors et al. |
| 2023/0071900 | A1 | 3/2023 | Lin et al. |

FOREIGN PATENT DOCUMENTS

| | | | |
|---|---|---|---|
| TW | 200835764 | A | 9/2008 |
| TW | 202000463 | A | 1/2020 |
| TW | 202309371 | A | 3/2023 |
| WO | 95/32093 | A1 | 11/1995 |
| WO | 2017/136621 | A1 | 8/2017 |
| WO | 2021/030340 | A1 | 2/2021 |
| WO | 2023/024022 | A1 | 3/2023 |

OTHER PUBLICATIONS

International Search Report and Written Opinion received for PCT Patent Application No. PCT/US2024/036873, mailed on Oct. 7, 2024, 13 pages.

Written Opinion of the International Preliminary Examining Authority received for PCT Patent Application No. PCT/US2024/036873, mailed on Jun. 10, 2025, 6 pages.

International Preliminary Report on Patentability received for PCT Patent Application No. PCT/US2024/036873, mailed on Oct. 8, 2025, 9 pages.

International Search Report and Written Opinion received for PCT Patent Application No. PCT/US2026/010620, mailed on Mar. 30, 2026, 12 pages.

* cited by examiner 100
110
112
114
118
120
122
124
126

410
405
114
412

112

210
205
110
212

512
120
114
112
110
510

510
514
120
110
112
114
512
516

110
212
916
210
514
914
918
912
910
110
210
916
212
514
914
918
912
920
926
210
514
110
924
112
922
120/930
514
110
112
928
934
210
516
110
936
932
112
940
210
514
110
112
120/930
516
938
120/930
948
110
112
946
514
412
942
114
120
514
510
110
112
114
512
950
954
510
952

1112
1110
1116
1114

1315
1110
1010
1210
1116

210
1012
1016
1010
1014

1215
1010
1110
1210

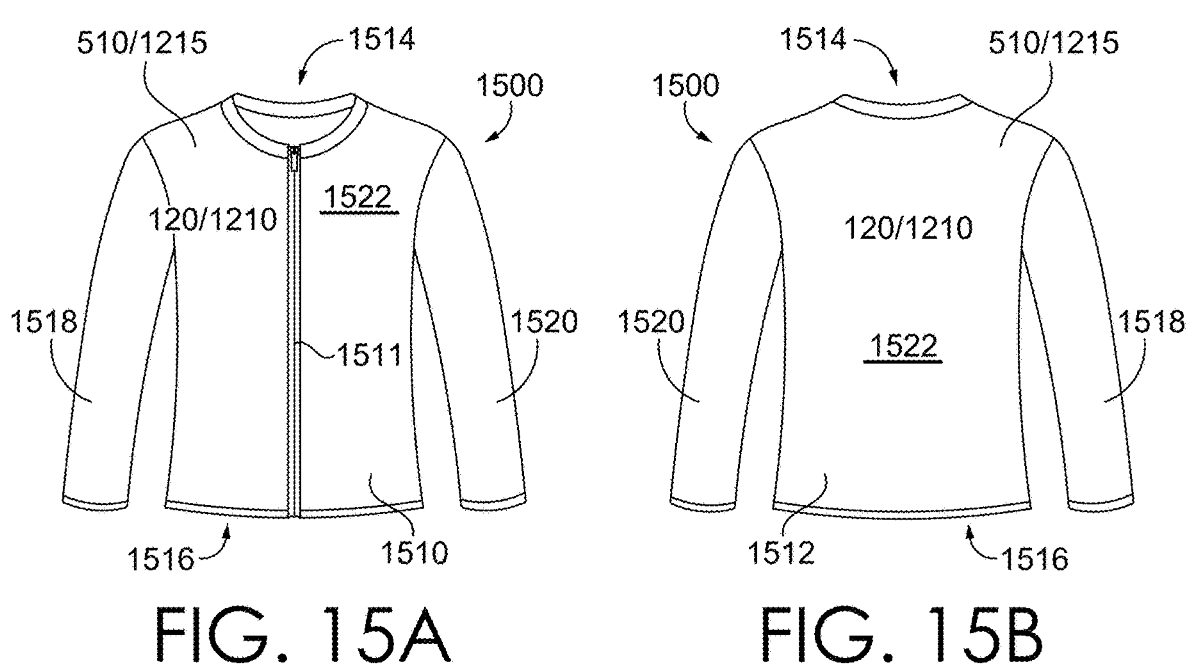
FIG. 15A
FIG. 15B
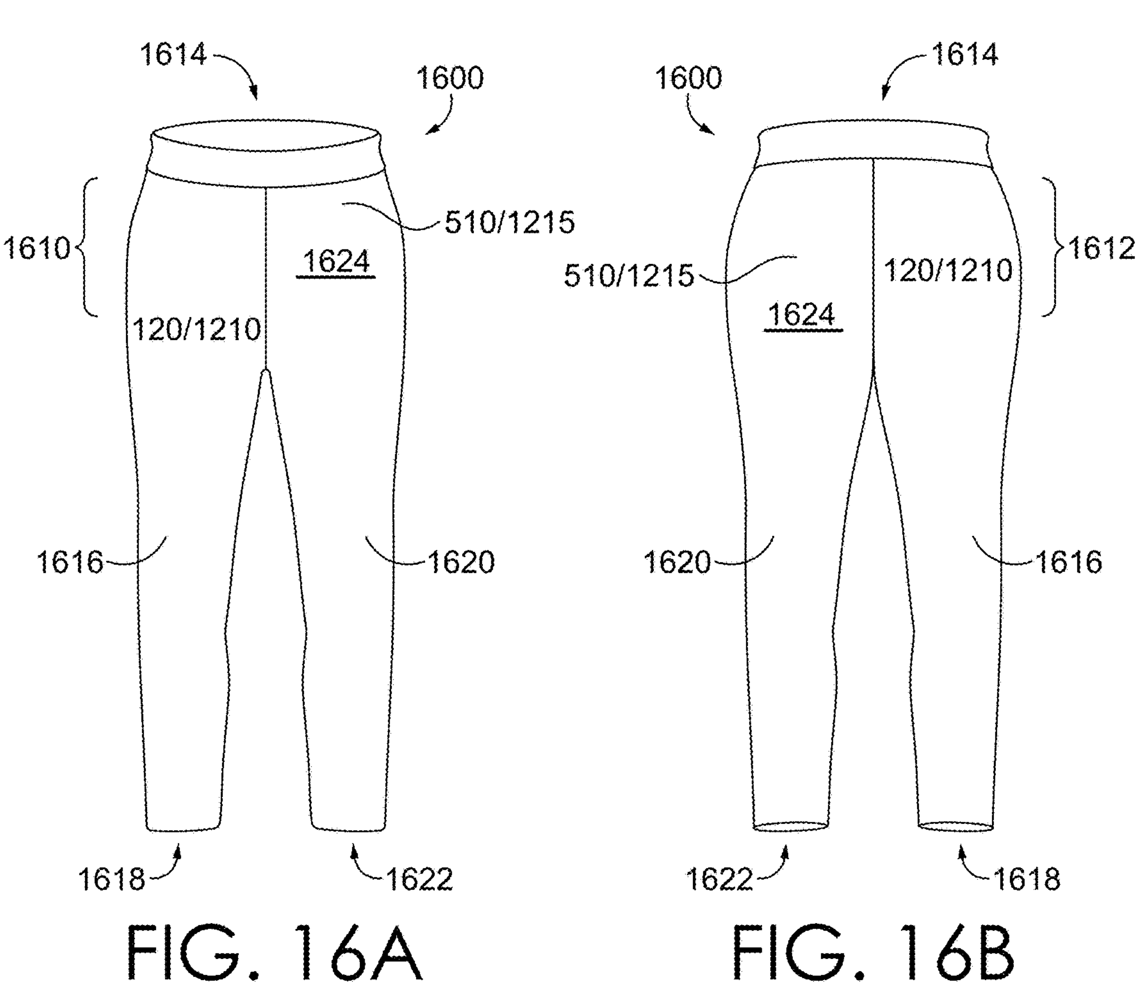
FIG. 16A
FIG. 16B

WATERPROOF, BREATHABLE NONWOVEN TEXTILES FOR ARTICLES AND METHODS OF MAKING THE SAME

CROSS REFERENCE TO RELATED APPLICATIONS

This application claims the priority benefit of U.S. Provisional Patent Application No. 63/525,482 (filed Jul. 7, 2023), which is hereby incorporated herein by reference in its entirety.

TECHNICAL FIELD

This specification describes waterproof, breathable nonwoven textiles for articles and methods of making the same.

BACKGROUND

Conventional articles (e.g., wearable articles, bags, etc.) designed for inclement weather conditions (e.g., precipitation) generally are formed from a knit or woven textile. In some cases, the knit or woven textile can be combined with a waterproof, breathable membrane. However, knit and/or woven textiles are often manufactured using processes (e.g., knitting, weaving, dyeing, etc.) that are less sustainable and/or that consume relatively high amounts of energy.

BRIEF DESCRIPTION OF THE DRAWINGS

Subject matter of this disclosure is related to waterproof, breathable nonwoven textiles and is described in detail below with reference to the attached drawing figures.

FIGS. 15A-15B illustrate front and back views respectively of a first example article of apparel for an upper body formed from the first composite textile and/or the second composite textile in accordance with aspects herein.

FIGS. 16A-16B illustrate front and back views respectively of a second example article of apparel for a lower body formed from the first composite textile and/or the second composite textile in accordance with aspects herein.

DETAILED DESCRIPTION

Figure 1:
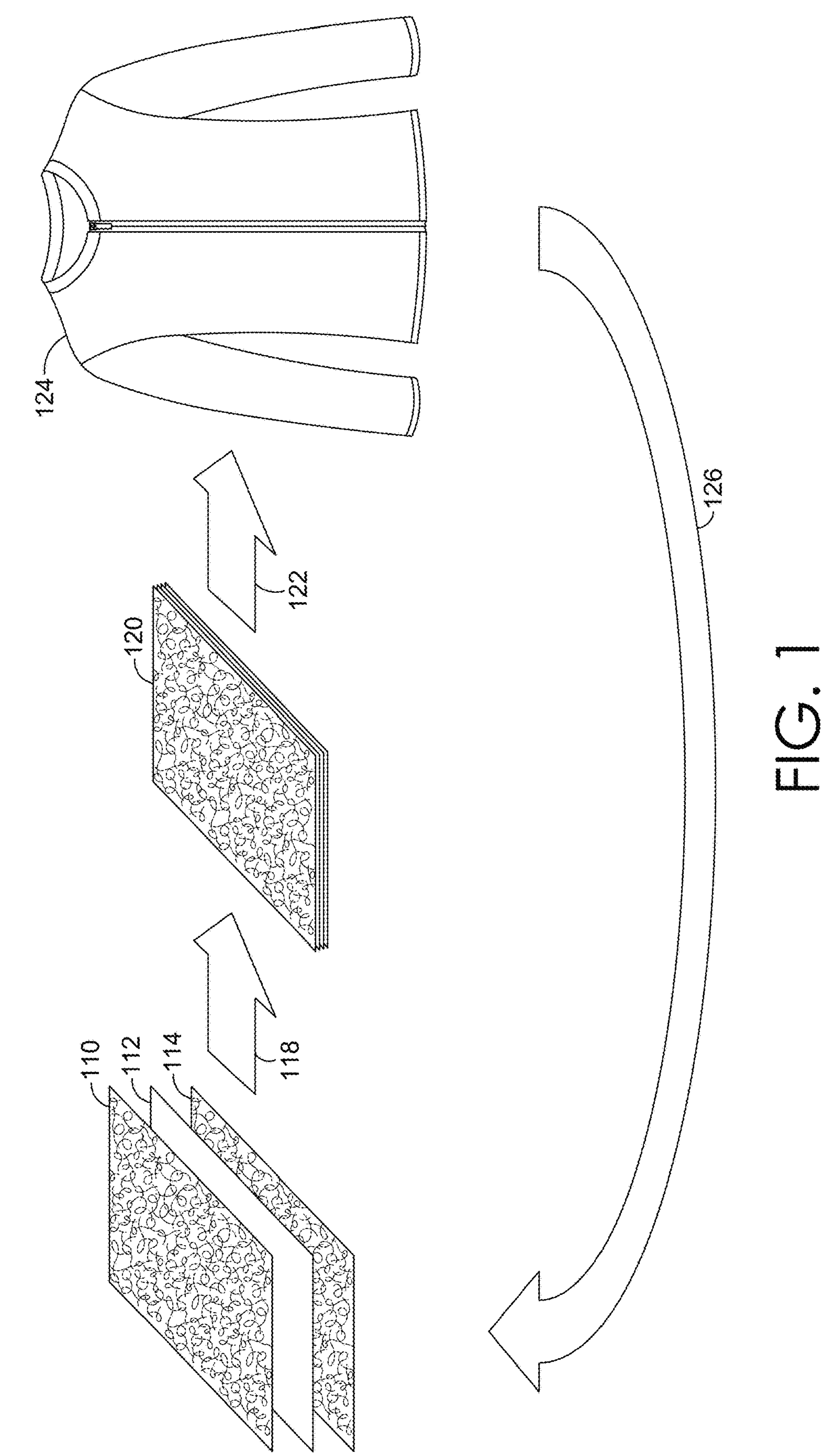
FIG. 1 illustrates an example lifecycle for an example first composite textile in accordance with aspects herein.

This specification describes waterproof, breathable nonwoven textiles and methods of making the same. In at least some instances, the waterproof, breathable nonwoven textiles can be intended for articles (e.g., wearable articles, bags, etc.) used in inclement weather (e.g., precipitation). In examples of this disclosure, one or more nonwoven textile layers can be combined with a waterproof, breathable membrane. For instance, the one or more nonwoven textile layers can include a spunlace layer, entangled fibers (e.g., needle-entangled staple fibers), and/or other type(s) of nonwoven textile(s) such as spunbond, meltblown, and the like. In addition to being water proof, the one or more nonwoven textile layers can include additional properties, such as water repellency, color properties (e.g., via colorant applied or impregnated through various means, such as sublimated or in a $CO_2$ medium as a supercritical fluid), air permeability, anti-pilling, and the like. In contrast to conventional waterproof textiles, the subject matter of the present disclosure can be more sustainable (e.g., by using fewer resources to manufacture, by being conducive to manufacturing with recycled materials—including shredded articles, by being easier to recycle into future products, and the like). These and other examples associated with the present disclosure are described in more detail below.

In contrast to the present disclosure, some conventional textiles designed for inclement conditions (e.g., precipitation) generally are formed from a knit or woven textile on to which a durable water repellant coating is applied. In another example, a waterproof, breathable membrane may be sandwiched or positioned between knit and/or woven textiles. Knit and/or woven textiles are often manufactured using processes (e.g., knitting or weaving) that are less sustainable and/or that consume more energy than other textile manufacturing processes. Moreover, coloring processes used to finish knit and/or woven textiles generally consume a high amount of energy. For example, a typical dyeing process for knit and/or woven textiles includes a water dyeing process along with a drying process. Both the water consumption and the energy used to dry the textile increase the carbon footprint of the textile. Furthermore, the structure of conventional knit and/or woven textiles is typically not conducive to incorporating fibers derived from varied categories of recyclable and/or recycled goods, including shredded articles, which may limit sustainability.

As indicated, examples of this disclosure can include a composite textile incorporating one or more nonwoven textile layers and sustainable processes for forming the same, where the composite textile is suitable to form articles designed for inclement weather such as rain, sleet, or snow. Nonwoven textiles by themselves can be porous due to the spaces between entangled fibers. In some instances, these spaces can permit water to pass through the textile and/or can sometimes trap water and/or moisture and, as such, nonwoven textiles have traditionally not been used for articles designed for inclement weather. Examples of this disclosure contemplate combining one or more nonwoven textile layers with a waterproof, breathable membrane and/or a durable water repellant deposit to impart waterproof and/or water repellant properties to the composite textile.

In addition, some examples of the present disclosure can include the waterproof and/or water repellant nonwoven textile having a printed component. In examples, a printed component is a deposit or application of any functional material (e.g., fluid, such as in liquid form, gas form, supercritical form, etc.) onto a composite textile (e.g., onto or into the fibers). The deposit can be via any of a variety of application processes (e.g., printing process), such as screen printing, print head, padding (e.g., stamp padding, solution padding (in a bath), etc.), gravure, sublimation printing, extrusion, $CO_2$ dyeing, and the like. The material of the printed component can be configured to perform one or more various functions, such as coloring or pattern forming, pilling reduction, water repellency (e.g., water-based or solvent-based durable water repellant (DWR)), waterproofness, vapor control, anti-cling, standoff for breathability, surface roughness or smoothness, and the like.

In general, the composite textile disclosed herein, in contrast to conventional nonwoven textiles (e.g., textiles comprising a knit, braided, and/or woven construction), is sustainable and/or is sustainably produced. For example, the nonwoven textile layers may incorporate fibers from disparate recycled-fiber sources, which provides additional utilization options for various end-of-life articles. In contrast, conventional textiles and systems may limit the sources from which recycled fibers are accepted and fail to provide non-landfill disposal options for various types of goods. Moreover, the composite textile described herein may be part of a closed loop or a semi-closed loop that uses a raw material (e.g., a polymer material) to produce an article of apparel and that repeatedly uses that same raw material (e.g., the same polymer material) to produce subsequent generations of articles of apparel. Among other things, these aspects contribute to sustainability by using and reusing materials that may otherwise be discarded in a landfill.

In line with this, aspects herein contemplate that the composite textile, and articles of apparel formed from the composite textile, are fully recyclable. Stated differently, the nonwoven textile layer(s) and the waterproof, breathable membrane in the composite textile may be from the same or similar polymer class which facilitates complete recyclability as well as case of recyclability (e.g., components of the composite textile do not have to separated or sorted prior to recycling or shredding) of the textile and/or apparel. For example, fibers (i.e., fibers or filaments) selected to form the nonwoven textile layers may include recycled materials including recycled polyethylene terephthalate (PET) fibers, commonly known as polyester fibers. Additionally, materials selected to form the waterproof, breathable membrane may include recycled materials that may be from the same or similar polymer class as the fibers in the nonwoven textile layers. Because the fibers and the materials used to form the waterproof, breathable membrane are from the same or similar polymer class, the components of the composite textile generally do not have to be separated prior to recycling. Further, use of recycled fibers and materials reduces the carbon footprint of the composite textile.

In one example, a composite textile may comprise a first nonwoven textile layer bonded to a waterproof, breathable membrane. The first nonwoven textile layer comprises a durable water repellant deposit. When the first composite textile is formed into an article (e.g., wearable article, bag, etc.), the first nonwoven textile layer can form an outer-facing surface of the article. Thus, the outer-facing surface of the article generally repels water due to the durable water repellant deposit. In addition, the use of the waterproof, breathable membrane creates an additional barrier to water penetration while still allowing vapor (e.g., moisture vapor produced by the wearer) to escape to the external environment, which contributes to wearer comfort.

In example aspects, the first composite textile may optionally comprise a second layer that, as compared to the first nonwoven layer, is on the opposite side of the waterproof, breathable membrane. When the composite textile is formed into an article, the second layer can form an inner-facing surface of the article of apparel. The second layer can be a variety of different materials or forms, such as a nonwoven textile layer, a knit layer, a woven layer, a printed layer, and the like.

In at least one example, the second layer includes a second nonwoven textile layer also bonded to the waterproof, breathable membrane such that the membrane is positioned between the two nonwoven textile layers. When the composite textile is formed into an article, the second nonwoven textile layer can form an inner-facing surface of the article of apparel. In example aspects, the use of the second nonwoven textile layer not only increases the durability of the composite textile but also creates a soft hand to the inner-facing surface of the article, which further contributes to wearer comfort. In some examples, the first nonwoven textile and the second nonwoven textile can include a same type of nonwoven textile (e.g., both can include a spunlace nonwoven textile). In some examples, the first nonwoven textile and the second nonwoven textile can include, as compared to one another, different types of nonwovens. For instances, one of the nonwoven textiles can include a spunlace (e.g., the first nonwoven layer) and the other of the nonwoven textiles can include a different type of nonwoven textile, such as a spunbond (e.g., the second nonwoven layer).

As described, nonwoven textiles in general are prone to pilling. Aspects herein contemplate applying a chemical binder to the first nonwoven textile layer to create a plurality of chemical bonding sites. One or more fibers are adhered together at the chemical bonding sites which reduces the tendency of the terminal ends of the fibers from migrating and entangling to form pills. In example aspects, the chemical binder is applied only to the first nonwoven textile layer as this layer may be more prone to pilling due to abrasion with objects in the external environment compared to the second nonwoven textile layer. Moreover, in example aspects, the chemical binder is not applied to the second nonwoven textile layer or a lower amount of the chemical binder is applied to the second nonwoven textile layer to maintain the drapability and/or hand of the composite textile.

Aspects herein further contemplate that the first nonwoven textile layer may comprise a printed component such that the resulting composite textile has a pleasing color and/or pattern aesthetic. Unlike traditional dyeing processes used with knit and/or woven textiles that include water baths to dye the textile and subsequent drying processes, aspects herein contemplate applying the printed component to the first nonwoven textile layer using a colorant (applied, for example, using a screen mesh gravure process) and/or applying a sublimation dye using a sublimation printing process.

In some examples, a printed component can be added or applied to a nonwoven textile (e.g., the first nonwoven textile layer and/or the second nonwoven textile layer) via $CO_2$ as a medium, instead of water. For instance, $CO_2$ can be transitioned to a supercritical state (SC—$CO_2$), in which the $CO_2$ can have a very high solvent power, allowing the colorant (e.g., dye or pigment) to dissolve easily. Due to high permeability, dyes can be transported easily and deeply into fibers (e.g., fiber impregnation), which can contribute to vibrant colors. In some cases, these processes can use less energy than other dyeing processes (e.g., often associated with knit and/or woven textiles) and may lower the overall carbon footprint of the composite textile.

The order in which the durable water repellant, the chemical binder, and the printed component are applied to the first nonwoven textile layer can, in some cases, be selected to improve the performance, operation, and functionality of each of the deposits. For example, the printed component, whether applied by way of a colorant or a sublimation printing process or $CO_2$ process, may be applied prior to bonding the first nonwoven textile layer to the waterproof, breathable membrane. In example aspects, this can be done because the typically higher temperatures associated with applying color or dye (e.g., from about 140 degrees Celsius to about 160 degrees Celsius) may impact the structural integrity of the waterproof, breathable membrane which may have a melting point of, for example, around 150-160 degrees Celsius. When a colorant is applied to the first nonwoven textile layer using, for example, a screen mesh gravure process, the chemical binder may be applied simultaneously with the colorant which reduces the number of processing steps. In aspects where sublimation printing is used to apply the printed component to the first nonwoven textile layer, the chemical binder may be applied subsequent to bonding the first nonwoven textile layer to the waterproof-breathable membrane. In some examples, these processes can be carried out in any order, and/or the steps can be rearranged.

The application of the durable water repellant, by way of, for example, a padding process to the first nonwoven textile layer can occur after the first nonwoven textile layer is bonded to the waterproof, breathable membrane. In example aspects, this sequence of operations can reduce the likelihood of the durable water repellant affecting the adhesive that is used to bond the first nonwoven textile layer to the waterproof, breathable membrane. For example, in aspects a polyurethane-reactive (PUR) adhesive film may be used to bond the two layers. As used herein, the terms “adhesive layer” and “adhesive film” may be used synonymously and/or they may relate to the same feature. PUR adhesives generally create cross-links when exposed to moisture which helps to form a secure bond between the waterproof, breathable membrane and the first nonwoven textile layer and reduces the chance of delamination. Applying the durable water repellant to the first nonwoven textile layer prior to the bonding step can interfere with the cross-linking step which results in a weaker bond between the layers and an increased chance of delamination. When sublimation printing is used to apply the printed component to the first nonwoven textile layer, the durable water repellant may be applied after the chemical binder so that the durable water repellant does not affect the ability of the chemical binder to adhere fibers together at the chemical bonding sites. This may be at least partially mitigated by selecting a water-based durable water repellant and a water-based chemical binder such that the durable water repellant and the chemical binder are compatible to some degree. In some cases, the DWR can be applied prior to the bonding (e.g., lamination) step. In some instances, the selection of materials and adhesives can allow for these above steps to be carried out in a variety of different orders or sequences.

In examples, after application of the durable water repellant, the second nonwoven textile layer (when used) can be bonded to the waterproof, breathable film using, for example, an additional adhesive film. Because the second nonwoven textile layer is not (in some instances) treated with a durable water repellant, the issues noted above with cross-linking might be of lesser concern.

Aspects herein contemplate an example second composite textile having at least waterproof and breathable properties. In this example, a waterproof, breathable membrane is bonded to a nonwoven textile layer. When the resulting composite textile is formed into an article, the waterproof, breathable membrane can form an outer-facing surface of the article, and the nonwoven textile layer can form an inner-facing surface of the article of apparel where its soft hand may contribute to wearer comfort. In this aspect, the waterproof, breathable membrane may optionally include a durable water repellant deposit, but aspects herein contemplate that a durable water repellant may not be used making the composite textile potentially more suitable for light rain conditions.

With respect to the second composite textile, the waterproof, breathable membrane may be selected to have a desired color eliminating the need to apply a printed component to the composite textile. Further, because the outer-facing surface of the article of apparel comprises the waterproof, breathable membrane, a chemical binder is generally not used since pilling is not an issue. The elimination of these steps may increase the manufacturing efficiency associated with the second composite textile. In addition, the textile can, in general, provide a relatively lightweight (e.g., basis weight) as compared to other textiles intended to be usable in inclement weather, such as for waterproofness.

As used herein, the term “article of apparel” is intended to encompass articles worn by a wearer, which can also be referred to as apparel articles or “wearable articles.” Wearable articles can include upper-body garments (e.g., tops, t-shirts, pullovers, hoodies, jackets, coats, and the like); lower-body garments (e.g., pants, shorts, tights, capris, unitards, and the like); headwear; gloves and mittens; sleeves (arm sleeves, calf sleeves); footwear articles (e.g., uppers for shoes); and the like. Aspects herein contemplate embodiments where the composite textile, and/or the wearable article, and/or the article of apparel does not comprise any knit, braided, and/or woven construction. As used herein, the term “finished goods” may include articles of apparel or wearable articles, equipment such as bags, furniture, and other such items. As used herein, the term “roll goods” may include, for example, rolls of textile, scraps or remnants remaining after pieces are cut from rolls, and the like.

The term “inner-facing surface” when referring to the wearable article means the surface that is configured to face towards a body surface of a wearer (or away from an external environment), and the term “outer-facing surface” means the surface that is configured to face opposite of the inner-facing surface, away from the body surface of the wearer, and toward an external environment. The term “innermost-facing surface” or “innermost surface” means the surface closest to the body surface of the wearer with respect to other layers of the wearable article, and the term “outermost-facing surface” or “outermost surface” means the surface that is positioned furthest away from the body surface of the wearer with respect to the other layers of the wearable article.

As used herein, the term "nonwoven textile" refers to fibers and/or filaments that are held together by mechanical and/or chemical interactions without being in the form of a knit, woven, braided construction, or other structured construction. The terms "fibers" and "filaments" both generally refer to a material having a high ratio of length to cross-sectional area. Fibers (including "staple fibers") can differ from filaments in that fibers are typically shorter, based on their natural state (e.g., wool, cotton, etc.), based on the manner in which they are manufactured (e.g., cut to a desired staple length), and/or based on fiber source (e.g., shredded-article fibers which may have differing or varied lengths). On the other hand, filaments can often be longer than fibers and often have an undefined length that is generated based on the method of manufacture. However, in some instances, filaments can have shorter lengths than fibers. Aspects herein contemplate that fibers and/or filaments may be used to form the nonwoven textile layers. When referring to fibers the same description can also refer to or describe filaments and vice versa.

In a particular aspect, the nonwoven textile includes a collection of fibers (i.e., fibers and/or filaments) that are mechanically manipulated to form a mat-like material. Stated differently nonwoven textiles are directly made from fibers and/or filaments. The nonwoven textile may include different webs of fibers formed into a cohesive structure, where the different webs of fibers may have a different or similar composition of fibers and/or different properties. Examples of nonwoven textiles can include a fiber web formed with staple or shredded fibers, a spunbond textile, a spunlace textile, a melt-blown textile, and the like, and any and all combinations thereof.

In example aspects, the mechanical manipulation contemplated herein may include needle entanglement (i.e., needlepunching) and/or fluid entanglement (i.e., hydroentanglement). Needlepunching generally uses barbed or spiked needles to reposition a percentage of fibers or filaments from a generally horizontal orientation (an orientation extending along an x, y plane) to a generally vertical orientation (a z-direction orientation). Hydroentanglement generally uses fine, high pressure jets of water which penetrate a web of fibers and/or filaments, which may be carded and/or cross-lapped, causing the fibers and/or filaments to entangle. One example nonwoven textile created using hydroentanglement is commonly known as spunlace. Spunlace nonwoven textiles are generally commercially available, inexpensive, and lightweight.

The fibers (i.e., fibers and/or filaments) contemplated herein may be formed of a number of different materials (e.g., cotton, nylon and the like) including polyester, such as polyethylene terephthalate (PET). The fibers may include virgin material fibers (fibers that have not been recycled) and/or recycled material fibers. Recycled fibers include "shredded-article fibers" and/or "re-pelletized polymer fibers." As used herein, shredded-article fibers include fibers that are direct by-products of shredding a fiber-containing article (e.g., knit, woven, nonwoven, etc.). In some examples, shredded-article fibers may be derived without pelletizing and extrusion through processes that consume less energy, and as such, textiles that incorporate shredded-article fibers may have a lower carbon footprint. In general, due to the shredding process, shredded-article fibers generally have a varied length with respect to each other. Re-pelletized polymer fibers include fibers that are extruded from pelletized or chipped by-products derived from polymer-containing sources (e.g., polymer-containing bottles or containers; polymer-fiber articles that are knit, woven, nonwoven; roll goods; textile manufacturing scrap; fiber webs at various stages of carding, lapping, pre-needling, and needling; etc.). In general, re-pelletized polymer fibers generally have a uniform length.

When referring to the composite textile described herein, the composite textile may include a first face and an opposite second face which both face outward with respect to an interior of the composite textile and comprise the outermost faces of the composite textile. As such, when viewing the composite textile, the first face and the second face are each fully visible. The first face and the second face may both extend along x, y planes that are generally parallel and offset from each other. For instance, the first face may be oriented in a first x, y plane and the second face may be oriented in a second x, y plane generally parallel to and offset from the first x, y plane.

The term "waterproof, breathable membrane" as used herein refers to a layer that exhibits both waterproof properties (e.g., resistance to water penetration) and is breathable (e.g., the ability to transport moisture vapor away from a wearer's body to the external environment). These properties may be obtained through, for example, microperforations in the membrane. In another example, the membrane may be hydrophilic such that the membrane attracts water molecules from moisture vapor and transports the molecules through the membrane to the external environment. Aspects herein further contemplate that the waterproof, breathable membrane may have stretch and recovery properties (i.e., is elastically resilient) in at least one orientational axis, which includes both a membrane having stretch and recovery in a single orientational axis and a membrane having stretch and recovery in multiple orientational axes. Examples of an orientational axis include a length direction, a width direction, an x-direction, a y-direction, and any direction angularly offset from a length direction, a width direction, an x-direction, and a y-direction.

Some example materials used to form the waterproof, breathable membrane contemplated herein include polymers. In some examples, the polymers can include an olefin. In some examples the olefin can include a polyolefin. In examples, the polyolefin can include polyethylene, polypropylene, or a combination thereof. In some examples, the polymer can comprises polyurethane. In some examples, the polymer can include a thermoplastic polymer. In some examples, the polymer can include a thermoplastic elastomer. In some examples, the polymer can include a recycled polymer. In some examples, the polymer can include recycled polyurethane (rPU), thermoplastic polyurethane (TPU), recycled TPU (rTPU), thermoplastic polyether ester elastomer (TPEE), recycled TPEE (rTPEE), polytetrafluoroethylene (PTFE), recycled PTFE (rPTFE), and the like.

Aspects herein refer to a printed component which generally includes a color or color property. The term "color" or "color property" as used herein refers to an observable color of fibers (i.e., fibers and/or filaments) that form the composite textile. Such aspects contemplate that a color may be any color that may be afforded to fibers using dyes, pigments, and/or colorants that are known in the art. As such, fibers may be configured to have a color including, but not limited to red, orange, yellow, green, blue, indigo, violet, white, black, and shades thereof. In one example aspect, the color may be imparted to the fiber when the fiber is formed (commonly known as dope dyeing). In dope dyeing, the color is added to the fiber as it is being extruded such that the color is integral to the fiber and is not added to the fiber in a post-formation step. In other aspects described herein, the color may be added to the fiber after the fiber is formed and incorporated into a nonwoven textile layer. This may be done through the application of a colorant using, for example, a screen mesh gravure process, sublimation printing, padding, spraying, and the like.

Aspects related to a color further contemplate determining if one color is different from another color. In these aspects, a color may comprise a numerical color value, which may be determined by using instruments that objectively measure and/or calculate color values of a color of an object by standardizing and/or quantifying factors that may affect a perception of a color. Such instruments include, but are not limited to spectroradiometers, spectrophotometers, and the like. Thus, aspects herein contemplate that a "color" of a textile provided by fibers and/or filaments may comprise a numerical color value that is measured and/or calculated using spectroradiometers and/or spectrophotometers. Moreover, numerical color values may be associated with a color space or color model, which is a specific organization of colors that provides color representations for numerical color values, and thus, each numerical color value corresponds to a singular color represented in the color space or color model.

In these aspects, a color may be determined to be different from another color if a numerical color value of each color differs. Such a determination may be made by measuring and/or calculating a numerical color value of, for instance, a first textile having a first color with a spectroradiometer or a spectrophotometer, measuring and/or calculating a numerical color value of a second textile having a second color with the same instrument (i.e., if a spectrophotometer was used to measure the numerical color value of the first color, then a spectrophotometer is used to measure the numerical color value of the second color), and comparing the numerical color value of the first color with the numerical color value of the second color. In another example, the determination may be made by measuring and/or calculating a numerical color value of a first area of a textile with a spectroradiometer or a spectrophotometer, measuring and/or calculating a numerical color value of a second area of the textile having a second color with the same instrument, and comparing the numerical color value of the first color with the numerical color value of the second color. If the numerical color values are not equal, then the first color or the first color property is different than the second color or the second color property, and vice versa.

Further, it is also contemplated that a visual distinction between two colors may correlate with a percentage difference between the numerical color values of the first color and the second color, and the visual distinction will be greater as the percentage difference between the color values increases. Moreover, a visual distinction may be based on a comparison between colors representations of the color values in a color space or model. For instance, when a first color has a numerical color value that corresponds to a represented color that is black or navy and a second color has a numerical color value that corresponds to a represented color that is red or yellow, a visual distinction between the first color and the second color is greater than a visual distinction between a first color with a represented color that is red and a second color with a represented color that is yellow.

The term "pill" or "pilling" as used herein refers to the formation of small balls of fiber ends (i.e., fiber ends and/or filament ends) on a facing side of the composite textile. The pill may extend away from a surface plane of the face. Pills are generally formed during normal wash and wear due to forces (e.g., abrasion forces) that cause the fiber ends to migrate through the face of the nonwoven textile and entangle with other fiber ends. A textile's resistance to pilling may be measured using standardized tests such as Random Tumble and Martindale Pilling tests.

As used herein, the term "chemical bonding" refers to the use of chemical binders (e.g., adhesive materials) that are used to hold fibers together, filaments together, and/or fibers and filaments together. In general, the chemical binder joins the fibers together, the filaments together, and/or the fibers and filaments together at areas where the fibers and/or filaments intersect with each other (e.g., cross each other) and bonding results. In one example aspect, the chemical binder may form an adhesive film the bonds the fibers and/or filaments together at, for example, fiber-fiber, filament-filament, and/or fiber-filament intersections. Because the fibers and/or filaments are adhered together, the terminal ends of the fibers and/or filaments are less prone to migration and pilling, and the overall pilling resistance of the composite textile is increased.

Suitable chemical binders can include those that comprise polymers and may include vinyl polymers and copolymers, acrylic ester polymers and copolymers, rubber and synthetic rubber, and natural binders such as starch. The chemical binder may be applied in an aqueous dispersion (i.e., water-based), an oil-based dispersion (or solvent-based), a foam dispersion, and the like. The term "chemical bonding site," as used herein refers to the location of the chemical bond and it furthers refers to the chemical binder itself as applied to, for example, a nonwoven textile layer at the chemical bonding site. Aspects herein contemplate that the chemical binder may be clear in color so as not to affect the color properties of the printed component.

As used herein, the term "deposit" generally means a physical material that is applied to a substrate in a continuous or discontinuous manner. The term "finish" when used herein generally refers to a material that imparts some property to a substrate (e.g., a color, water repellency, adhesion between fibers and/or filaments, wicking, and the like). In this context, a finish is applied as a deposit (continuous or discontinuous) to a substrate.

Various measurements may be provided herein with respect to the nonwoven textile layers and the resulting composite textile. Thickness may be measured using a precision thickness gauge. To measure thickness, for example, a composite textile, a nonwoven textile layer, and/or a waterproof, breathable membrane may be positioned on a flat anvil and a pressure foot is pressed on to it from the upper surface under a standard fixed load. A dial indicator on the precision thickness gauge gives an indication of the thickness in millimeters (mm), micrometers (μm), and the like. Basis weight is measured using ISO3801, Method 5 (1977) testing standard and has the units grams per square meter (gsm). Textile stiffness, which generally corresponds to drape is measured using ASTMD4032 (2008) testing standard using a pneumatic actuator and a digital gauge with a 25 Kgf capacity and has the units kilogram force (Kgf). The composite textile's resistance to water penetration is measured using ISO811 (1981) (commonly known as the Hydrostatic Pressure Test) and has the units of mm. In example aspects, the term "waterproof" as used herein means the waterproof, breathable membrane and/or the composite textile is able to resist water penetration of a column of water of at least 450 mm. The composite textile's resistance to vapor transport (RET), which indirectly measures the case at which moisture vapor passes through the composite textile, is measured using ISO11092 (2014) with a 10 inch plate. In example aspects, the term "breathable" as used herein means that the composite textile has an RET from about 15 RET to about 60 RET. The composite textile's resistance to surface wetting, which is a measure of water repellency, is measured using ISO4920 (2012). With respect to surface wetting, the washing condition is NAL™0020V 3.2, SDL Vortex M6 Washer with a 16±1 minute machine wash at 40 degrees Celsius±3 degrees with 1.0±0.01 g/L EC detergent. The wash is done without detergent during the last wash cycle followed by a tumble dry.

Unless otherwise noted, all measurements provided herein are measured at standard ambient temperature and pressure (25 degrees Celsius or 298.15 K and 1 bar) with the composite textile in a resting (un-stretched) state.

As used herein, the term "about" means generally within ±10% of an indicated value unless indicated otherwise.

FIG. 1 is a schematic depiction of an example lifecycle for the composite textile contemplated herein. The depiction is of the first composite textile but the following description can also apply to the second composite textile or other composite textiles described herein. Reference numeral 100 generally indicates a first nonwoven textile layer 110, a waterproof, breathable membrane 112, and an optional second nonwoven textile layer 114 in a stacked configuration prior to bonding. In example aspects, the fibers (i.e., fibers and/or filaments) used to form the first and second nonwoven textile layers 110 and 114 may include recycled fibers and/or filaments and, in particular, recycled polyester (e.g., PET) fibers and/or filaments. Additionally, the waterproof, breathable membrane 112, in example aspects, may be formed of a material that is recyclable. Arrow 118 schematically represents a bonding step where the first nonwoven textile layer 110 and the second nonwoven textile layer 114 are bonded to the waterproof, breathable membrane 112 to form a first composite textile 120. In this aspect, the waterproof, breathable membrane 112 is positioned between the first nonwoven textile layer 110 and the second nonwoven textile layer 114. Arrow 122 schematically represents a processing step where the first composite textile 120 is formed into an article of apparel 124. Although the article of apparel 124 is shown as an upper-body garment, it is contemplated herein that the article of apparel 124 may take other forms such as a lower-body garment, an upper of a shoe, a hat, gloves, sleeves, and the like. At the end of the life of the article of apparel 124, it is contemplated that a wearer may return the article of apparel 124 to, for example, a manufacturer/retailor where the article of apparel 124 may be fully recycled as indicated by arrow 126 to form shredded-article fibers and/or re-pelletized polymer fibers and/or filaments that are used to form webs of fibers and/or filaments such as the first and second nonwoven textile layers 110 and 114 and potentially a waterproof, breathable membrane such as the waterproof, breathable membrane 112 thus creating a self-sustaining loop. This self-sustaining loop reduces the carbon impact typically associated with creating articles of apparel including knit, woven, and nonwoven articles of apparel.

Figures 2, 3, 4, 5, 6:
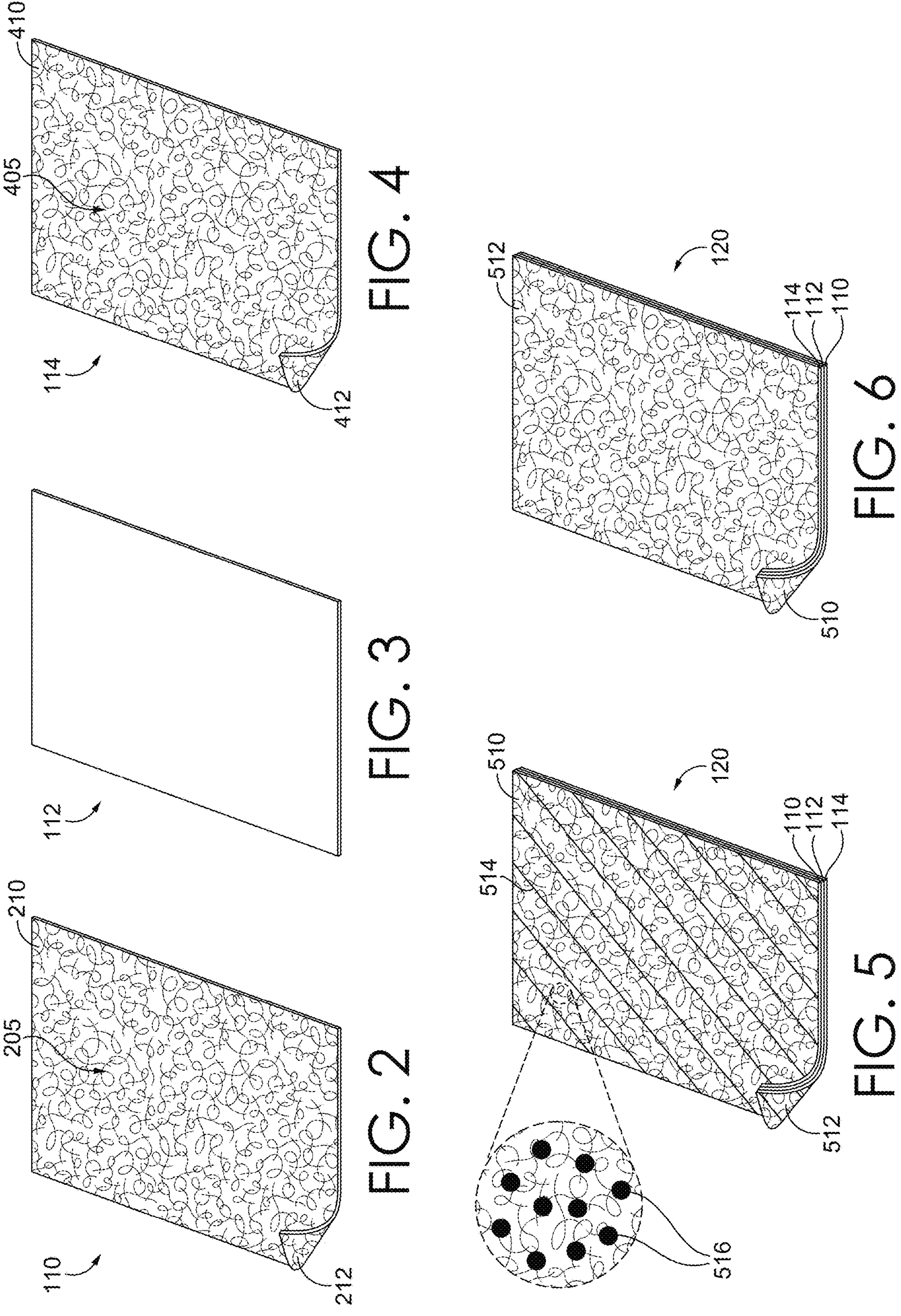
FIG. 2 illustrates a first nonwoven textile layer for use in the first composite textile of FIG. 1 in accordance with aspects herein.
FIG. 3 illustrates a waterproof, breathable membrane for use in the first composite textile of FIG. 1 in accordance with aspects herein.
FIG. 4 illustrates an optional second nonwoven textile layer for use in the first composite textile of FIG. 1 in accordance with aspects herein.
FIG. 5 illustrates a first face of the first composite textile of FIG. 1 in accordance with aspects herein.
FIG. 6 illustrates an opposite second face of the first composite textile of FIG. 1 in accordance with aspects herein.

FIG. 2 depicts a schematic of the first nonwoven textile layer 110 formed of entangled fibers and/or filaments such as fiber and/or filament 205 (depicted schematically). The first nonwoven textile layer 110 includes a first side 210 and an opposite second side 212. When the first nonwoven textile layer 110 is incorporated into the composite textile 120, the first side 210 forms a first face of the composite textile 120. When the composite textile 120 is formed into an article of apparel, it is contemplated that the first face forms an outer-facing surface, and in some aspects an outermost-facing surface of the article of apparel.

In example aspects, properties of the first nonwoven textile layer 110 such as basis weight, thickness, types of fibers and/or filaments, and the like may be selected to achieve desired end properties for the composite textile 120. Because the first nonwoven textile layer 110 forms an outer-facing surface of a resulting article of apparel, desired properties may include durability, coverage, and resistance to abrasion. Additional factors to be considered include a relatively low basis weight to reduce the overall weight of the resulting article of apparel. In one example aspect, the first nonwoven textile layer 110 may comprise an entangled web of fibers formed via needlepunching (i.e., a needle entangled web) and having a basis weight from about 50 gsm to about 100 gsm, from about 60 gsm to about 90 gsm, from about 65 gsm to about 85 gsm, or from about 70 gsm to about 80 gsm.

In another example aspect, the first nonwoven textile layer 110 may comprise a spunlace textile having a basis weight from about 30 gsm to about 125 gsm, from about 35 gsm to about 100 gsm, or about 40 gsm. Targeting a basis weight in this range for the spunlace textile that forms the first nonwoven textile layer 110 provides for the resulting composite textile 120 having a basis weight in a desired range after the first nonwoven textile layer 110 is combined with the waterproof, breathable membrane 112 and the optional second nonwoven textile layer 114. Moreover, targeting a basis weight in this range for the spunlace textile that forms the first nonwoven textile layer 110 provides a stable substrate (i.e., a substrate that is less prone to tearing or wrinkling) for printing including sublimation printing.

In example aspects, the fibers and/or filaments 205 used to form the first nonwoven textile layer 110 may include polyester (e.g., PET) fibers (recycled or virgin) although other virgin and recycled fiber types are contemplated herein (e.g., polyamide, cotton, and the like). In one example aspect, the fibers and/or filaments 205 may include 100% by weight of recycled fibers such as 100% by weight of recycled polyester fibers. However, in other aspects, the fibers and/or filaments 205 may include 100% by weight virgin fibers, or other combinations of virgin and recycled fibers, as desired. In some examples, the fibers 205 can include a blend of fibers.

In some examples, the fibers 205 can be continuous, such as when formed by a melt-blown process and/or spunbond process. In some examples, the fibers 205 may comprise a uniform length such as when the fibers are formed from virgin extruded polyester or re-pelletized polyester and cut to a defined length. In other aspects, the fibers 205 may include a variation of staple length such as when the fibers 205 are derived from a shredded-article fiber source. In examples, the fibers 205 may comprise from about 10% to about 100% fibers derived from a shredded-article fiber source, from about 20% to about 90% fibers derived from a shredded-article fiber source, from about 30% to about 80% fibers derived from a shredded-article fiber source, from about 40% to about 70% fibers derived from a shredded-article fiber source, or from about 50% to about 60% fibers derived from a shredded-article fiber source. Any and all aspects, and any variation thereof, are contemplated as being within aspects herein.

FIG. 3 depicts a schematic of the waterproof, breathable membrane 112. The waterproof, breathable membrane 112 may include a spunbond layer, a meltblown layer, a film, and the like. In example aspects, the waterproof, breathable membrane may have a thickness from about 10 μm to about 30 μm, from about 15 μm to about 25 μm, or about 20 μm or about 18 μm. In example aspects, the waterproof, breathable membrane 112 may have a basis weight from about 10 gsm to about 30 gsm, from about 15 gsm to about 25 gsm, or about 16 gsm or about 20 gsm. In at least some examples, a lighter and thinner membrane 112 (e.g., thickness of 18 μm and basis weight of 16 gsm) can contribute to a better handfeel of the composite textile, as compared to a composite textile that includes a heavier and/or thicker membrane. The waterproof, breathable membrane 112 may comprise a PU, an rPU, a TPU, an rTPEE, or an rPTFE material, or any other materials described in this disclosure associated with the waterproof, breathable membrane 112.

When formed of a recycled material, aspects herein contemplate that the waterproof, breathable membrane 112 comprises at least about 50% recycled material, about 60% recycled material, about 70% recycled material, about 80% recycled material, about 90% recycled material, or about 100% recycled material. The waterproof, breathable membrane 112 may be selected to have a low basis weight to maintain a low basis weight for the resulting article of apparel, to be waterproof, to be breathable which contributes to the comfort features of an apparel item formed from the composite textile 120, and to be pliable to reduce the stiffness of the composite textile 120.

FIG. 4 depicts a schematic of the optional second nonwoven textile layer 114 formed of entangled fibers and/or filaments such as fiber and/or filament 405 (depicted schematically). The second nonwoven textile layer 114 includes a first side 410 and an opposite second side 412. When the second nonwoven textile layer 114 is incorporated into the composite textile 120, the first side 410 forms a second face of the composite textile 120. When the composite textile 120 is formed into an article of apparel, it is contemplated that the second face forms an inner-facing surface, and in some aspects an innermost-facing surface of the article of apparel. In example aspects, use of the second nonwoven textile layer 114 in the composite textile 120 contributes to the durability of the composite textile 120, and it also imparts a soft hand to the second face of the composite textile 120.

In example aspects, properties of the second nonwoven textile layer 114 such as basis weight, thickness, types of fibers and/or filaments, and the like may be selected to achieve desired end properties for the composite textile 120. Because the second nonwoven textile layer 114 forms an inner-facing surface of a resulting article of apparel, desired properties may include, for example, a soft hand. Additional factors to be considered include a relatively low basis weight to reduce the overall weight of the resulting article of apparel.

In one example aspect, the second nonwoven textile layer 114 may comprise an entangled web of fibers formed via needlepunching (i.e., a needle entangled web) and having a basis weight from about 50 gsm to about 100 gsm, from about 60 gsm to about 90 gsm, from about 65 gsm to about 85 gsm, or from about 70 gsm to about 80 gsm.

In another example aspect, the second nonwoven textile layer 114 may comprise a spunlace textile having a basis weight from about 30 gsm to about 125 gsm, from about 35 gsm to about 100 gsm, or about 40 gsm. Targeting a basis weight in this range for the spunlace textile forming the second nonwoven textile layer 114 provides for a resulting composite textile 120 having a basis weight in a desired range after the second nonwoven textile layer 114 is combined with the waterproof, breathable membrane 112 and the first nonwoven textile layer 110.

In another example aspect, the second nonwoven textile layer 114 may comprise a spunbond textile having a low basis weight from about 8 gsm to about 16 gsm, from about 10 gsm to about 14 gsm, or about 12 gsm. In examples, the spunbond textile can comprise a scrim. Targeting a basis weight in this range for the spunbond textile forming the second nonwoven textile layer 114 provides for a resulting composite textile 120 having a basis weight in a desired range after the second nonwoven textile layer 114 is combined with the waterproof, breathable membrane 112 and the first nonwoven textile layer 110.

In example aspects, the fibers and/or filaments 405 used to form the second nonwoven textile layer 114 may include polyester fibers (recycled or virgin PET) although other virgin and recycled fiber types are contemplated herein (e.g., polyamide, cotton, and the like). In one example aspect, the fibers and/or filaments 405 may include 100% by weight of recycled fibers such as 100% by weight of recycled polyester fibers. However, in other aspects, the fibers and/or filaments 405 may include 100% by weight virgin fibers, or other combinations of virgin and recycled fibers, as desired.

In some examples, the fibers 405 can be continuous, such as when formed by a melt-blown process or a spunbond process. In some examples, the fibers 405 may comprise a uniform length such as when the fibers are formed from virgin extruded material or re-pelletized polymer material and cut to a defined length. In other aspects, the fibers 405 may include a variation of staple length such as when the fibers 405 are derived from a shredded-article fiber source. In one example aspect, the fibers 405 may comprise from about 10% to about 100% fibers derived from a shredded-article fiber source, from about 20% to about 90% fibers derived from a shredded-article fiber source, from about 30% to about 80% fibers derived from a shredded-article fiber source, from about 40% to about 70% fibers derived from a shredded-article fiber source, or from about 50% to about 60% fibers derived from a shredded-article fiber source. Any and all aspects, and any variation thereof, are contemplated as being within aspects herein.

In at least some examples, the second layer can include, as opposed to a second nonwoven layer, some other textile layer, such as a knit, woven, film, and the like.

FIG. 5 depicts a schematic of the composite textile 120 after being processed to include, for example, one or more deposits such as a durable water repellant deposit (e.g., water based or solvent based), a printed component, and/or a chemical binder. In example aspects, the composite textile 120 may be processed to include three deposits including the durable water repellant deposit, the printed component, and the chemical binder. In other example aspects, the composite textile 120 may be processed to include two deposits such as the durable water repellant deposit and the printed component, the durable water repellant deposit and the chemical binder, or the printed component and the chemical binder. In yet other example aspects, the composite textile 120 may be processed to include just one deposit such as just the durable water repellant deposit, just the printed component, or just the chemical binder. The composite textile 120 includes the first nonwoven textile layer 110, the waterproof, breathable membrane 112, and the optional second nonwoven textile layer 114, where the waterproof, breathable membrane 112 is positioned between the first nonwoven textile layer 110 and the second nonwoven textile layer 114. The composite textile 120 has a first face 510 formed from the first side 210 of the first nonwoven textile layer 110 and a second face 512 formed the first side 410 of the second nonwoven textile layer 114; the first face 510 is primarily visible in FIG. 5.

Aspects herein contemplate a number of different combinations of spunlace and needle entangled webs for the composite textile 120. For example, one combination comprises a spunlace textile for the first nonwoven textile layer 110, an rTPEE material or rPU material for the waterproof, breathable membrane 112, and a spunlace textile for the second nonwoven textile layer 114.

A second combination comprises a spunlace textile for the first nonwoven textile layer 110, an rTPEE or rPU material for the waterproof, breathable membrane 112, and a needle entangled web for the second nonwoven textile layer 114.

A third combination comprises a needle entangled web for the first nonwoven textile layer 110, an rTPEE or rPU material for the waterproof, breathable membrane 112, and a needle entangled web for the second nonwoven textile layer 114.

An additional combination comprises a needle entangled web for the first nonwoven textile layer 110, an rTPEE or rPU material for the waterproof, breathable membrane, and a spunlace material for the second nonwoven textile layer 114.

Aspects herein further contemplate additional types of nonwoven materials for the first and second nonwoven textile layers 110 and 114 including, for example, a spunbond material and/or a melt-blown material. For example, an additional combination for a composite textile includes a spunlace textile for the first nonwoven textile layer 110, an rTPEE material or rPU material for the waterproof, breathable membrane 112, and a spunbond (e.g., very low basis weight between about 10 gsm and about 14 gsm; or about 12 gsm). Aspects herein also contemplate using different materials for the waterproof, breathable membrane 112 such as rPU, TPU, rPTFE, and the like. Any and all aspects, and any combination thereof, are contemplated as being within aspects herein.

After being processed, the composite textile 120 includes one or more deposits such as a durable water repellant deposit (not shown), a printed component 514 (depicted using diagonal lines), and/or a chemical binder (depicted as a plurality of chemical bonding sites 516 in the magnified view of FIG. 5). In one example aspect, these deposits are applied to only the first nonwoven textile layer 110 and not to the second nonwoven textile layer 114. The durable water repellant deposit is applied to only the first nonwoven textile layer 110 since this is the layer that forms an outer-facing surface of an article of apparel formed from the composite textile 120. Similarly, the printed component 514 is applied to only the first nonwoven textile layer 110 since this is the layer that is visible when the resulting article of apparel is worn. The chemical bonding sites 516 are present only on the first nonwoven textile layer 110 to preserve the hand and the drape of the composite textile 120. In example aspects, the amount of surface area of the first nonwoven textile layer 110 occupied by the chemical bonding sites 516 may be between about 10% to about 70%, or between about 40% to about 60% to produce a pilling resistance of 2 or greater based on the Martindale Pilling Test while still maintaining desired drape, hand, and growth and recovery characteristics. Another example herein contemplates that when the resulting article of apparel is reversible, a durable water repellant, a printed component, and/or a chemical binder may also be applied to the second nonwoven textile layer 114.

FIG. 6 depicts the composite textile 120 and primarily depicts the second face 512 of the composite textile 120. In one example aspect, and as depicted, the second face 512 of the composite textile 120 does not include a printed component, a durable water repellant deposit, or chemical bonding sites.

In at least some examples, the inner face of the composite textile 120 (e.g., the face that is configured to face or orient towards a wearer when the article of apparel is worn as intended) can include a material deposit (e.g., ink or other solution). In some examples, the material deposit can impart various characteristics, such as color, aesthetic patterning, anti-cling, and the like. The material deposit can be applied using various techniques, such as via gravure, spray, screen, ink head, etc. In some examples, the material deposit can be applied to a second textile layer (e.g., a second nonwoven layer).

In at least some examples, a material deposit can be applied to an inner face of the waterproof, breathable membrane 112, such as where the second textile layer is omitted. As such, an example composite textile of the present disclosure can include the first nonwoven layer 110 (e.g., as a outermost layer of the composite textile), the waterproof, breathable membrane 112, and a material deposit layer (e.g., printed layer) on the inner face of the waterproof, breathable membrane 112 that, as compared to the first nonwoven layer 110, is positioned on the opposite side of the waterproof, breathable membrane 112. In such examples, the membrane 112 can include a PU or rPU membrane that includes a microporous, hydrophobic membrane. In addition, the membrane 112 can include a basis weight of about 18 gsm to about 26 gsm; or about 22 gsm. In at least some examples, the membrane 112 can include a thickness of about 60 μm to about 80 μm; or about 70 μm.

The first composite textile 120 may exhibit characteristics making it suitable for use in inclement weather conditions. For example, when the first composite textile 120 comprises a spunlace material formed of 100% recycled polyester for both the first and second nonwoven textile layers 110 and 114, and an rTPEE or rPU film for the waterproof, breathable membrane 112, the composite textile 120 may be lightweight having a basis weight from about 110 gsm to about 150 gsm, from about 115 gsm to about 145 gsm, from about 120 gsm to about 140 gsm, or about 130 gsm. The composite textile 120 may exhibit a resistance to water penetration from about 8,000 mm to about 12,000 mm, from about 9,500 mm to about 10,500 mm, or about 10,000 mm. The composite textile 120 may have an RET (i.e., a resistance to vapor transport) from about 15 RET to about 22 RET, from about 16 RET to about 20 RET, from about 17 RET to about 19 RET, or about 18 RET. The composite textile 120 may have a resistance to surface wetting from about 2.5 to about 6, or from about 4 to about 5 before wash and after three washes and after 20 washes. The composite textile 120 in this example, may have a resistance to pilling from about 2 to about 5, from about 2.5 to about 4.75, or from about 3 to about 4.5 using the Martindale Pilling Test. When compared to the formation of a composite textile comprising a waterproof, breathable membrane positioned between two woven layers, the formation of the composite textile 120 may exhibit a reduction in energy costs (i.e., carbon) of from about 60% to about 70%.

Figure 7:
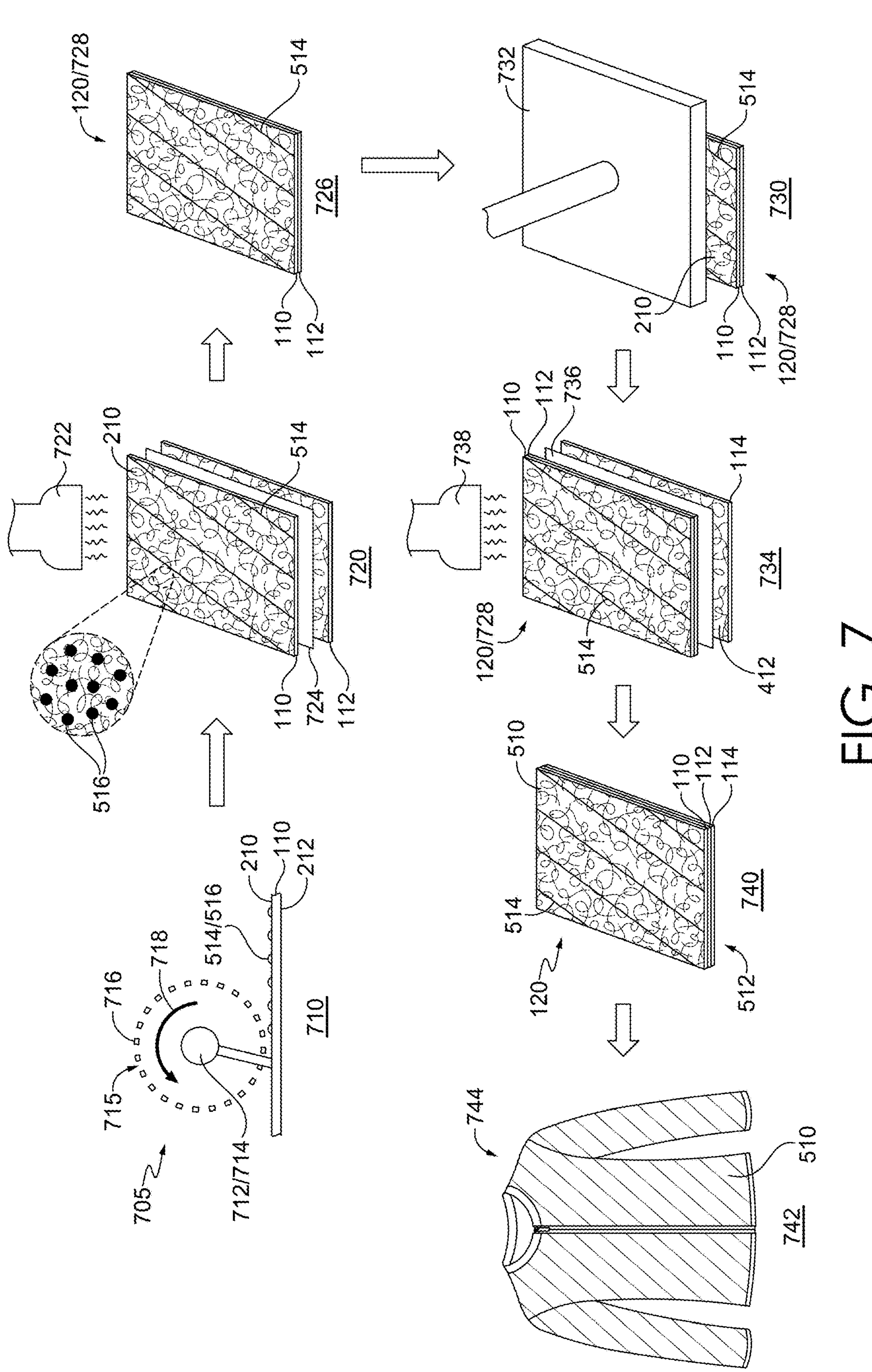
FIG. 7 illustrates a first example manufacturing process for forming the first composite textile of FIG. 1 in accordance with aspects herein.

FIG. 7 depicts a schematic of a first example process for forming the first composite textile 120. In general, a process for constructing the composite textile 120 can include various steps, including but not limited to, coloring one or more of the material layers (e.g., via $CO_2$ coloring, sublimation, etc.), applying anti-pilling coatings, applying DWR coating, printing, and laminating. These steps can be carried out in various orders, and FIG. 7 depicts an example of one order of operations.

In at least one example, at a step 710, a screen mesh gravure system 705 is used to simultaneously apply a colorant 712 and a chemical binder 714 to the first side 210 of the first nonwoven textile layer 110 to impart the printed component 514 to the first nonwoven textile layer 110 and to reduce the formation of pills on at least the first face 510 of the resulting composite textile 120 by creating the plurality of chemical bonding sites 516. The components depicted in association with the screen mesh gravure system 705 are illustrative and are meant to convey general concepts associated with the screen mesh gravure system 705. The system 705 may include additional components or fewer components, and the components may have different configurations than that shown. Other application methods known in the art, including additional types of gravure systems, are contemplated herein.

The screen mesh gravure system 705 includes a screen roller 716 adapted to rotate in a first direction 718. The screen roller 716 has a number of openings such as opening 715. In one example aspect, the screen roller 716 may have, for example, from about 30 openings per one linear inch to about 80 openings per one linear inch, from about 35 openings per one linear inch to about 70 openings per one linear inch, or from about 40 openings per one linear inch to about 60 openings per one linear inch. The number of openings per one linear inch may be selected to achieve a desired amount of coverage of the colorant 712 and the chemical binder 714 while still preserving the hand and drapability of the first nonwoven textile layer 110.

In example aspects, the screen roller 716 is supplied with the colorant 712 and the chemical binder 714. In one example, the colorant 712 and the chemical binder 714 may be mixed together such that the screen roller 716 simultaneously applies the colorant 712 and the chemical binder 714. Aspects herein also contemplate that the colorant 712 and the chemical binder 714 are supplied separately such that the screen roller 716 first applies the colorant 712 and then applies the chemical binder 714, or vice versa. As the screen roller 716 rotates in the first direction 718, the colorant 712 and the chemical binder 714 are deposited on to the first side 210 of the first nonwoven textile layer 110 in a density corresponding to the number of openings per linear inch. Stated differently, aspects herein contemplate a discontinuous application of the colorant 712 and the chemical binder 714 to generate a plurality of discrete colorant sites and a plurality of discrete chemical bonding sites (e.g., the chemical bonding sites 516). In example aspects when the colorant 712 and the chemical binder 714 are supplied together, the plurality of discrete colorant sites and the plurality of discrete chemical bonding sites may occupy generally the same location on the first side 210 of the first nonwoven textile layer 110. In example aspects when the colorant 712 and the chemical binder 714 are supplied separately, the plurality of discrete colorant sites and the plurality of discrete chemical bonding sites may occupy different locations, may partially overlap, or may completely overlap each other on the first side 210 of the first nonwoven textile layer 110. In example aspects, a viscosity of the colorant 712 and the chemical binder 714 before application may be selected to achieve a desired level of penetration into the first nonwoven textile layer 110 after the colorant 712 and the chemical binder 714 are applied to, for example, the first side 210 of the first nonwoven textile layer 110.

The screen roller 716 may be adapted to apply a certain amount of pressure and heat to the first nonwoven textile layer 110. For example, the application temperature may be from about 140 degrees Celsius to about 180 degrees Celsius, from about 150 degrees Celsius to about 170 degrees Celsius, or about 160 degrees Celsius. The amount of pressure supplied by the screen roller 716 is generally sufficient to ensure that an entirety of the first side 210 is brought into contact with the screen roller 716 such that an even coverage of the colorant 712 and the chemical binder 714 are applied to the first side 210 in a pattern corresponding to the number of openings per linear inch of the screen roller 716.

Although the screen mesh gravure system 705 is depicted as applying the colorant 712 and the chemical binder 714 to only the first side 210, aspects herein contemplate that the colorant 712 and the chemical binder 714 may also be applied to the second side 212 of the first nonwoven textile layer 110. For example, after the colorant 712 and the chemical binder 714 are applied to the first side 210, the first nonwoven textile layer 110 may be re-run through the screen mesh gravure system 705 such that the second side 212 is in contact with the screen roller 716.

As stated, the chemical binder 714 acts as an adhesive helping to secure fibers and/or filaments together in areas where it is applied. Because the fibers and/or filaments are adhered together, the terminal ends of, for example, the fibers and/or filaments are less prone to pilling and the overall pilling resistance of at least the first side 210 of the first nonwoven textile layer 110 is increased. For example, the pilling resistance may be about 2, 2.5, 3, 4.5, 4.75 or 5 on the Martindale Pilling test. As previously described, in example aspects, when the resulting composite textile 120 is incorporated into an article of apparel, the first face 510, which corresponds to the first side 210 of the first nonwoven textile layer 110 forms an outer-facing surface of the article. Thus, the application of the chemical binder 714 helps to increase the pilling resistance of the outer-facing surface of the article which may be more prone to abrasion than, for example, the inner-facing surface of the article.

At a step 720, the first nonwoven textile layer 110 is bonded to the waterproof, breathable membrane 112. In example aspects, the bonding may be achieved through use of a first adhesive film 724 that is positioned between the second side 212 of the first nonwoven textile layer 110 and the waterproof, breathable membrane 112. In example aspects, the first adhesive film 724 comprises a PUR-reactive adhesive film although other types of adhesive films are contemplated herein. Aspects herein also contemplate using non-film adhesives. For example, a liquid adhesive may be applied to one or more of the first nonwoven textile layer 110 and/or the waterproof, breathable membrane 112 before the bonding step 720. Dot lamination can also or alternatively be carried out as a bonding technique. With respect to the first adhesive film 724 in the form of a PUR-reactive adhesive, one or more of heat and pressure 722 are applied to the first nonwoven textile layer 110 and/or the waterproof, breathable membrane 112 to activate the first adhesive film 724 causing it to melt. In example aspects, the application temperature may be from about 80 degrees Celsius to about 105 degrees Celsius, from about 85 degrees Celsius to about 100 degrees Celsius, or from about 90 degrees Celsius to about 95 degrees Celsius. When the adhesive 724 cools and solidifies a bond is formed between the first nonwoven textile layer 110 and the waterproof, breathable membrane 112. The adhesive 724 then undergoes a moisture-curing step to further strengthen the bond between the first nonwoven textile layer 110 and the waterproof, breathable membrane 112, which further decreases the possibility of delamination. The result of the bonding step 720 may be the final composite textile 120, or, if the second nonwoven textile layer 114 is utilized, the result is a partial composite textile 728 as shown at step 726.

As described above, the bonding step 720 is carried out after the step 710 to avoid the higher temperatures associated with the application of the colorant 712 (e.g., around 160 degrees Celsius) from impacting the structural integrity of the waterproof, breathable membrane 112, which may have a melting temperature of about 155 degrees Celsius. For example, if the application of the colorant 712 occurs after the bonding step 720, the waterproof, breathable membrane 112 may partially melt, which may impact one or more of the waterproof and breathable properties of the membrane 112.

Step 730 depicts a padding system 732 adapted to apply a durable water repellant to the first side 210 of the first nonwoven textile layer 110. The components depicted in association with the padding system 732 are illustrative and are meant to convey general concepts associated with the padding system 732. Padding can include a stamp padding process or a bath padding process. The system 732 may include additional components or fewer components, and the components may have different configurations than that shown. Other application methods known in the art, including additional types of padding systems, spray systems, and the like, are contemplated herein. In example aspects, the padding step 730 occurs after the bonding step 720. This can be done to prevent the durable water repellant deposit from negatively impacting the moisture-curing step associated with the first adhesive film 724. After the padding step 730, aspects herein contemplate that at least about 50%, at least about 60%, at least about 70%, at least about 80%, at least about 90%, or at least about 100% of the surface area of the first side 210 of the first nonwoven textile layer 110 comprises a durable water repellant deposit. Aspects herein contemplate that the durable water repellant deposit may be primarily located on the first side 210 of the first nonwoven textile layer 110. In some aspects, the durable water repellant may at least partially penetrate the first nonwoven textile layer 110 such that the durable water repellant deposit may be at least partially located in the volume between the first side 210 and the second side 212 of the first nonwoven textile layer 110.

At an optional step 734, the partial composite textile 728 is bonded to the second nonwoven textile layer 114. In example aspects, the bonding may be achieved through use of a second adhesive film 736 that is positioned between the second side 412 of the second nonwoven textile layer 114 and the waterproof, breathable membrane 112. In example aspects, the second adhesive film 736 comprises a PUR-reactive adhesive film although other types of adhesive films are contemplated herein. Aspects herein also contemplate using non-film adhesives. For example, a liquid adhesive may be applied to one or more of the second nonwoven textile layer 114 and the waterproof, breathable membrane 112 before the second bonding step. With respect to the second adhesive film 736 in the form of a PUR-reactive adhesive, one or more of heat and pressure 738 are applied to the partial composite textile 728 and/or the second nonwoven textile layer 114 to bond the second nonwoven textile layer 114 to the waterproof, breathable membrane 112. The result of step 734 is the composite textile 120 as shown at step 740, where the composite textile 120 comprises the first face 510 and the opposite second face 512.

As indicated above, the various steps and operations depicted in FIG. 7 can include additional or different operations and can be carried out in a different sequence. For example, in at least one instance, the first nonwoven textile 110 can be subjected to a coloring process via $CO_2$ printing (e.g., impregnating the textile with supercritical $CO_2$ colorant, such as a dye). After the $CO_2$ printing, an anti-pilling coating (e.g., chemical binder) can be applied to the colored first nonwoven textile 110, such as via the gravure application process. In addition, after the gravure, the first nonwoven textile 110 can receive a DRW treatment, such as via a padding process (e.g., stamp padding, solution bath padding, etc.). After the first nonwoven textile 110 has been treated in these various respects, it can then be laminated with the waterproof, breathable membrane 112, such as via PUR adhesive layer, and optionally with a second textile layer (e.g., a spunlace layer, spunbond scrim, etc.) to form the composite textile layer 120.

At a step 742, the composite textile 120 is formed into a wearable article or an article of apparel 744. Although shown as an upper-body article of apparel, aspects herein contemplate that the composite textile 120 may be formed into other types of articles of apparel such as lower-body articles of apparel, uppers for shoes, gloves, hats, and the like. When the composite textile 120 is formed into the article of apparel 744, the first face 510 of the composite textile 120 forms an outermost-facing surface of the article of apparel 744. As described, the first face 510 of the composite textile 120 comprises the first side 210 of the first nonwoven textile layer 110 which includes the printed component 514, the plurality of chemical bonding sites 516, and the durable water repellant deposit. Thus, the viewable face of the article of apparel 744 comprises the printed component 514 which enhances the aesthetic appeal of the article of apparel 744. Moreover, the chemical bonding sites 516 on the first face 510 help to increase the resistance to pilling of the first face 510. The durable water repellant on the first face 510 makes the article of apparel 744 suitable for inclement weather including rain, sleet, or snow. The opposite second face 512 of the composite textile 120 comprises the second nonwoven textile layer 114. Because the second nonwoven textile layer 114 does not generally include any deposits (e.g., chemical binder, colorant, or durable water repellant), the soft hand and drapability of the second nonwoven textile layer 114 is maintained making it suitable for contact with a wearer's skin surface.

Figure 8:
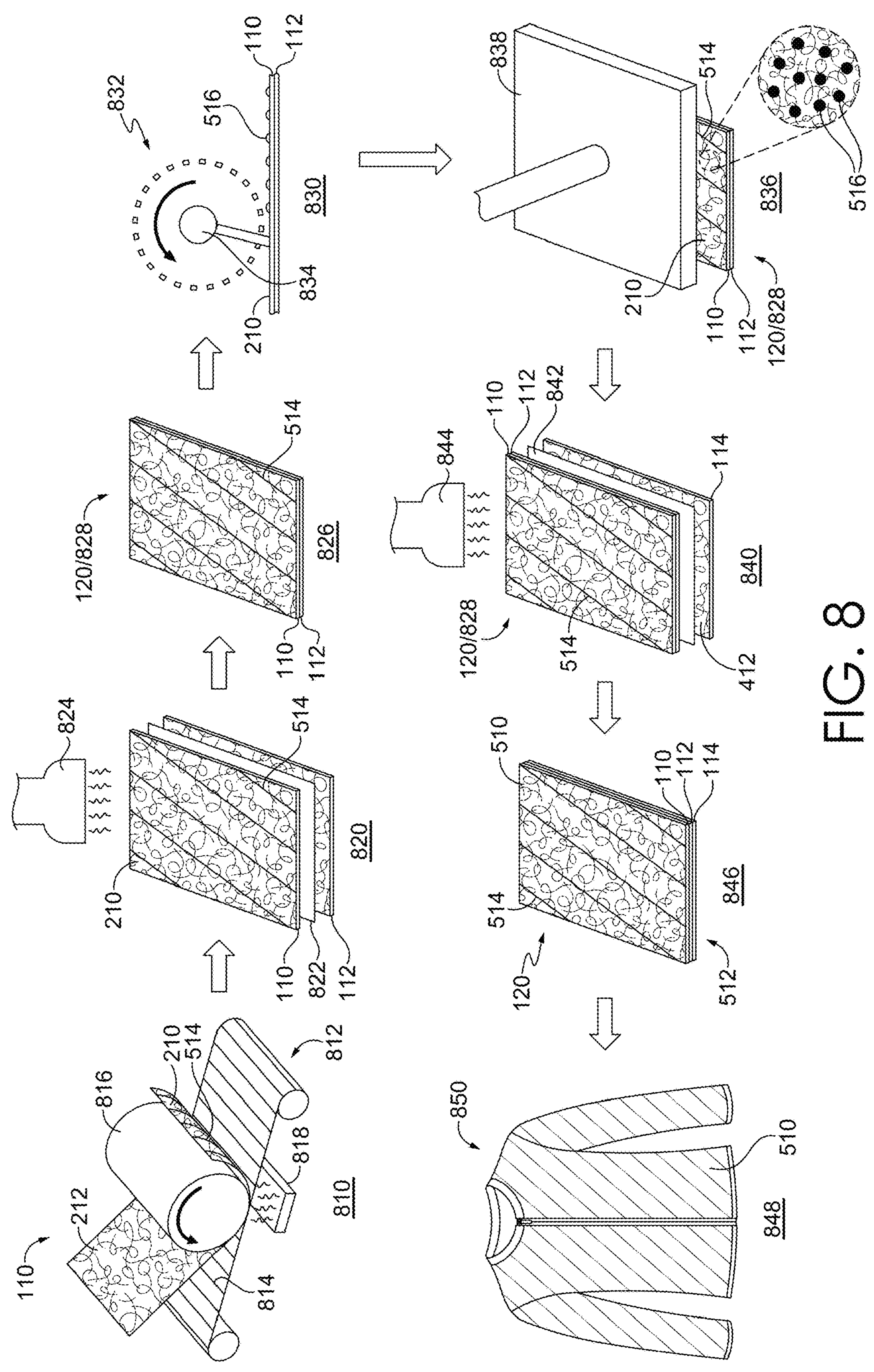
FIG. 8 illustrates a second example manufacturing process for forming the first composite textile of FIG. 1 in accordance with aspects herein.

FIG. 8 depicts a schematic of a second example process for forming the first composite textile 120. At a step 810, a sublimation printing system 812 applies the printed component 514 to the first side 210 of the first nonwoven textile layer 110. The components depicted in association with the sublimation printing system 812 are illustrative and are meant to convey general concepts associated with the sublimation printing system 812. The system 812 may include additional components or fewer components, and the components may have different configurations than that shown. Other application methods known in the art, including additional types of sublimation printing systems, $CO_2$ printing, and the like, are contemplated herein.

The system 812 may include a sublimation paper 814 on to which a pattern and/or color has been deposited by way of, for example, a sublimation printer (not shown). The first nonwoven textile layer 110 may be positioned such that the first side 210 is adjacent and/or in contact with the sublimation paper 814. In one example aspect, a roller 816 may advance the first nonwoven textile layer 110 in a machine direction while a heat source 818 applies heat to cause the pattern and/or color on the sublimation paper 814 to be transferred to the first side 210 of the first nonwoven textile layer 110 to form the printed component 514. In example aspects, the temperature associated with the heat source 818 may be from about 130 degrees Celsius to about 220 degrees Celsius, from about 135 degrees Celsius to about 210 degrees Celsius, or from about 140 degrees Celsius to about 200 degrees Celsius. The printed component 514 imparted by way of sublimation printing may have a desired color intensity that is different from or more intense than the printed component 514 imparted by way of the process depicted in FIG. 7.

At a step 820, the first nonwoven textile layer 110 is bonded to the waterproof, breathable membrane 112. In example aspects, the bonding may be achieved through use of a first adhesive film 822 that is positioned between the second side 212 of the first nonwoven textile layer 110 and the waterproof, breathable membrane 112. In example aspects, the first adhesive film 724 comprises a PUR-reactive adhesive film although other types of adhesive films are contemplated herein. Aspects herein also contemplate using non-film adhesives. For example, a liquid adhesive may be applied to one or more of the first nonwoven textile layer 110 and the waterproof, breathable membrane 112 before the bonding step 820. With respect to the first adhesive film 822 in the form of a PUR-reactive adhesive, one or more of heat and pressure 824 are applied to the first nonwoven textile layer 110 and/or the waterproof, breathable membrane 112 to activate the first adhesive film 822 causing it to melt. The application temperatures discussed in relation to the bonding step 720 in FIG. 7 are applicable to the bonding step 820 and further discussion regarding the first adhesive film 724 also applies to the first adhesive film 822 including how the first adhesive film 822 bonds the first nonwoven textile layer 110 to the waterproof, breathable membrane 112. The result of the bonding step 820 may be the final composite textile 120, or, if the second nonwoven textile layer 114 is utilized, the result is a partial composite textile 828 as shown at step 826.

The bonding step 820 is carried out after the sublimation printing step 810 to avoid the higher temperatures associated with the sublimation printing system 812 from impacting the structural integrity of the waterproof, breathable membrane 112, which may have a melting temperature of about 155 degrees Celsius. For example, if the sublimation printing step 810 occurs after the bonding step 820, the waterproof, breathable membrane 112 may partially melt, which may impact one or more of the waterproof and breathable properties of the membrane 112.

At a step 830, a chemical binder 834, and not a colorant, is deposited on to the first side 210 of the first nonwoven textile layer 110 using, for example, a screen mesh gravure system 832. The screen mesh gravure system 832 may be the same as the screen mesh gravure system 705 of FIG. 7, and the discussion of the screen mesh gravure system 705 as well as the chemical binder 714 also applies to the screen mesh gravure system 832 and the chemical binder 834. In example aspects, the application temperature of the chemical binder 834 may be from about 105 degrees Celsius to about 145 degrees Celsius, from about 110 degrees Celsius to about 140 degrees Celsius, or from about 120 degrees Celsius to about 130 degrees Celsius. To describe this differently, the application temperature of the chemical binder 834 is generally lower than the melting temperature of the waterproof, breathable membrane 112. Like the chemical binder 714, the chemical binder 834 is applied in a discontinuous pattern to the first side 210 of the first nonwoven textile layer 110 to create the plurality of discrete chemical bonding sites 516.

At a step 836, a padding system 838 applies a durable water repellant to the first side 210 of the first nonwoven textile layer 110. The components depicted in association with the padding system 838 are illustrative and are meant to convey general concepts associated with the padding system 838. The system 838 may include additional components or fewer components, and the components may have different configurations than that shown. Other application methods known in the art, including additional types of padding systems, spray systems, and the like, are contemplated herein. In example aspects, the padding step 836 occurs after the bonding step 820. As discussed above, this is done to prevent the durable water repellant deposit from negatively impacting the moisture-curing step associated with the first adhesive film 822. In further example aspects, the padding step 836 occurs after the application of the chemical binder 834 during step 830. In example aspects, this may be done to prevent the durable water repellant from inhibiting the adhesion of the chemical binder 834 to the first nonwoven textile layer 110. For example, if the chemical binder 834 is aqueous based and the durable water repellant is solvent-based, the durable water repellant may prevent the chemical binder from adhering to the surface of the first nonwoven textile layer 110. In other example aspects, when both the chemical binder 834 and the durable water repellant are water-based, the two deposits may be compatible with each other such that the order of application may comprise applying the chemical binder 834 first and then the durable water repellant or applying the durable water repellant first and then the chemical binder 834.

After the padding step 836, aspects herein contemplate that at least about 50%, at least about 60%, at least about 70%, at least about 80%, at least about 90%, or at least about 100% of the surface area of the first side 210 of the first nonwoven textile layer 110 comprises a durable water repellant deposit. Aspects herein contemplate that the durable water repellant deposit may be primarily located on the first side 210 of the first nonwoven textile layer 110. In some aspects, the durable water repellant may at least partially penetrate the first nonwoven textile layer 110 such that the durable water repellant deposit may be at least partially located in the volume between the first side 210 and the second side 212 of the first nonwoven textile layer 110.

At an optional step 840, the partial composite textile 828 is bonded to the second nonwoven textile layer 114. In example aspects, the bonding may be achieved through use of a second adhesive film 842 that is positioned between the second side 412 of the second nonwoven textile layer 114 and the waterproof, breathable membrane 112. In example aspects, the second adhesive film 842 comprises a PUR-reactive adhesive film although other types of adhesive films are contemplated herein. Aspects herein also contemplate using non-film adhesives. For example, a liquid adhesive may be applied to one or more of the second nonwoven textile layer 114 and the waterproof, breathable membrane 112 before the second bonding step 840. With respect to the second adhesive film 842 in the form of a PUR-reactive adhesive, one or more of heat and pressure 844 are applied to the partial composite textile 828 and/or the second nonwoven textile layer 114 to bond the second nonwoven textile layer 114 to the waterproof, breathable membrane 112. The result of step 840 is the composite textile 120 as shown at step 846, where the composite textile 120 comprises the first face 510 and the opposite second face 512.

At a step 848, the composite textile 120 is formed into a wearable article or an article of apparel 850. Although shown as an upper-body article of apparel, aspects herein contemplate that the composite textile 120 may be formed into other types of articles of apparel such as lower-body articles of apparel, uppers for shoes, gloves, hats, and the like. When the composite textile 120 is formed into the article of apparel 850, the first face 510 of the composite textile 120 forms an outermost-facing surface of the article of apparel 850. Properties associated with the article of apparel 744 of FIG. 7 are also applicable to the article of apparel 850 and will not be repeated herein.

Figure 9:
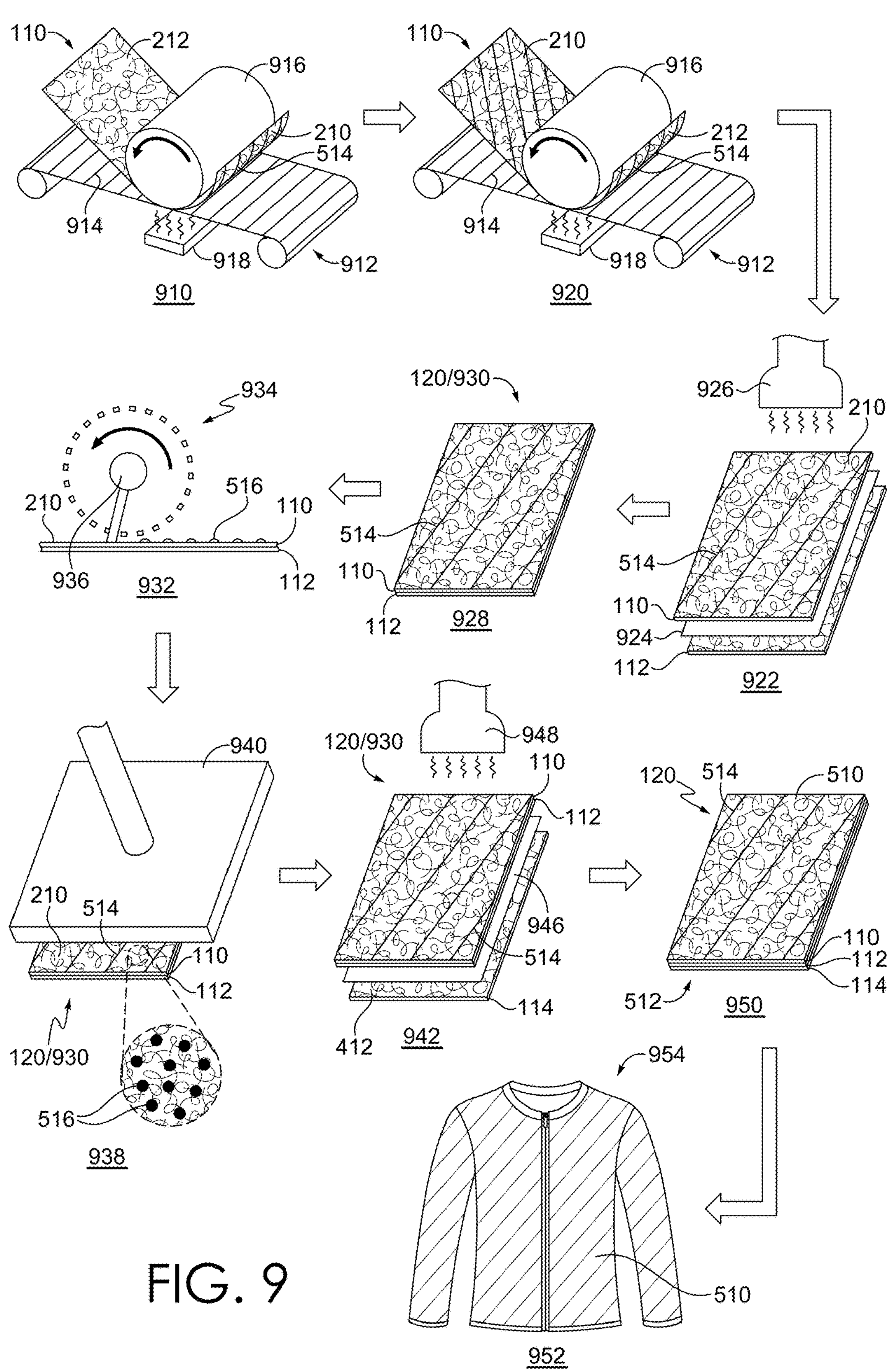
FIG. 9 illustrates a third example manufacturing process for forming the first composite textile of FIG. 1 in accordance with aspects herein.

FIG. 9 depicts a schematic of a third example process for forming the first composite textile 120. The process depicted in FIG. 9 is similar to that depicted in FIG. 8 except that sublimation printing is used to impart the printed component 514 to both the first side 210 and the second side 212 of the first nonwoven textile layer 110. Similar to the process in FIG. 8, $CO_2$ dyeing could be alternatively used here as well. At a step 910, a sublimation printing system 912 applies the printed component 514 to the first side 210 of the first nonwoven textile layer 110. Like FIG. 8, the components depicted in association with the sublimation printing system 912 are illustrative and are meant to convey general concepts associated with the sublimation printing system 912. The system 912 may include additional components or fewer components, and the components may have different configurations than that shown. Other application methods known in the art, including additional types of sublimation printing systems, are contemplated herein.

The system 912 may include a sublimation paper 914 on to which a pattern and/or color has been deposited by way of, for example, a sublimation printer (not shown). The first nonwoven textile layer 110 may be positioned such that the first side 210 is adjacent and/or in contact with the sublimation paper 914. In one example aspect, a roller 916 may advance the first nonwoven textile layer 110 in a machine direction while a heat source 918 applies heat to cause the pattern and/or color on the sublimation paper 914 to be transferred to the first side 210 of the first nonwoven textile layer 110 to form the printed component 514. In example aspects, the temperature associated with the heat source 918 may be from about 130 degrees Celsius to about 220 degrees Celsius, from about 135 degrees Celsius to about 210 degrees Celsius, or from about 140 degrees Celsius to about 200 degrees Celsius.

At a step 920, the first nonwoven textile layer 110 may be positioned such that the second side 212 is adjacent and/or in contact with the sublimation paper 914. Aspects herein contemplate that the same pattern and/or color is applied to the sublimation paper 914 in both the first printing step 910 and the second printing step 920. Other aspects herein contemplate that a different pattern and/or color is applied to the sublimation paper 914 in the second printing step 920 compared to the first printing step 910. In one example aspect, the roller 916 may advance the first nonwoven textile layer 110 in a machine direction while the heat source 918 applies heat to cause the pattern and/or color on the sublimation paper 914 to be transferred to the second side 212 of the first nonwoven textile layer 110 to form the printed component 514 on the second side 212.

In instances when the same pattern and/or color is applied to the sublimation paper 914 in the first printing step 910 and the second printing step 920, the intensity of the pattern and/or color on the first nonwoven textile layer 110 may be increased compared to one-sided printing as in the process shown in FIG. 8. In instances when a different pattern and/or color is applied to the sublimation paper 914 in the first printing step 910 and the second printing step 920, a desired color effect may be achieved that represents some combination of the two different patterns and/or colors. For example, because of the inherent spaces between the fibers and/or filaments in the first nonwoven textile layer 110, a color or pattern present on the second side 212 of the first nonwoven textile layer 110 may be at least partially visible on the first side 210 of the first nonwoven textile layer 110. Thus, for instance, a heather-type effect may be achieved by imparting, for example, a light green color to the first side 210 of the first nonwoven textile layer 110 and by imparting a grey or black color to the second side 212 of the first nonwoven textile layer 110.

At a step 922, the second side 212 of the first nonwoven textile layer 110 is bonded to the waterproof, breathable membrane 112. In example aspects, the bonding may be achieved through use of a first adhesive film 924 that is positioned between the second side 212 of the first nonwoven textile layer 110 and the waterproof, breathable membrane 112. In example aspects, the first adhesive film 924 comprises a PUR-reactive adhesive film although other types of adhesive films are contemplated herein. Aspects herein also contemplate using non-film adhesives. For example, a liquid adhesive may be applied to one or more of the first nonwoven textile layer 110 and the waterproof, breathable membrane 112 before the bonding step 922. With respect to the first adhesive film 924 in the form of a PUR-reactive adhesive, one or more of heat and pressure 926 are applied to the first nonwoven textile layer 110 and/or the waterproof, breathable membrane 112 to activate the first adhesive film 924 causing it to melt. The application temperatures discussed in relation to the bonding step 720 in FIG. 7 are applicable to the bonding step 922 and further discussion regarding the first adhesive film 724 also applies to the first adhesive film 924 including how the first adhesive film 924 bonds the first nonwoven textile layer 110 to the waterproof, breathable membrane 112. The result of step 922 may be the final composite textile 120, or, if the second nonwoven textile layer 114 is utilized, the result is a partial composite textile 930 as shown at step 928.

Similar to FIG. 8, the bonding step 922 is carried out after the sublimation printing steps 910 and 920 to avoid the higher temperatures associated with the sublimation printing system 912 from impacting the structural integrity of the waterproof, breathable membrane 112, which may have a melting temperature of about 155 degrees Celsius. For example, if the sublimation printing steps 910 and 920 occur after the bonding step 922, the waterproof, breathable membrane 112 may partially melt, which may impact one or more of the waterproof and breathable properties of the membrane 112.

At a step 932, a chemical binder 936 is deposited on to the first side 210 of the first nonwoven textile layer 110 using, for example, a screen mesh gravure system 934. The screen mesh gravure system 934 may be the same as the screen mesh gravure system 705 of FIG. 7, and the discussion of the screen mesh gravure system 705 as well as the chemical binder 714 also applies to the screen mesh gravure system 934 and the chemical binder 936. In example aspects, the application temperature of the chemical binder 936 may be from about 105 degrees Celsius to about 145 degrees Celsius, from about 110 degrees Celsius to about 140 degrees Celsius, or from about 120 degrees Celsius to about 130 degrees Celsius. In general, the application temperature of the chemical binder 936 is generally lower than the melting temperature of the waterproof, breathable membrane 112. Like the chemical binder 714, the chemical binder 936 is applied in a discontinuous pattern to the first side 210 of the first nonwoven textile layer 110 to create the plurality of discrete chemical bonding sites 516.

At a step 938, a padding system 940 applies a durable water repellant to the first side 210 of the first nonwoven textile layer 110. The components depicted in association with the padding system 940 are illustrative and are meant to convey general concepts associated with the padding system 940. The system 940 may include additional components or fewer components, and the components may have different configurations than that shown. Other application methods known in the art, including additional types of padding systems, spray systems, and the like, are contemplated herein. In example aspects, the padding step 938 occurs after the bonding step 922. As discussed above, this is done to prevent the durable water repellant deposit from negatively impacting the moisture-curing step associated with the first adhesive film 924. In further example aspects, the padding step 938 may occur before or after the application of the chemical binder 936 as discussed above.

After the padding step 938, aspects herein contemplate that at least about 50%, at least about 60%, at least about 70%, at least about 80%, at least about 90%, or at least about 100% of the surface area of the first side 210 of the first nonwoven textile layer 110 comprises a durable water repellant deposit. Aspects herein contemplate that the durable water repellant deposit may be primarily located on the first side 210 of the first nonwoven textile layer 110. In some aspects, the durable water repellant may at least partially penetrate the first nonwoven textile layer 110 such that the durable water repellant deposit may be at least partially located in the volume between the first side 210 and the second side 212 of the first nonwoven textile layer 110.

At an optional step 942, the partial composite textile 930 is bonded to the second nonwoven textile layer 114. In example aspects, the bonding may be achieved through use of a second adhesive film 946 that is positioned between the second side 412 of the second nonwoven textile layer 114 and the waterproof, breathable membrane 112. In example aspects, the second adhesive film 946 comprises a PUR-reactive adhesive film although other types of adhesive films are contemplated herein. Aspects herein also contemplate using non-film adhesives. For example, a liquid adhesive may be applied to one or more of the second nonwoven textile layer 114 and the waterproof, breathable membrane 112 before the second bonding step. With respect to the second adhesive film 946 in the form of a PUR-reactive adhesive, one or more of heat and pressure 948 are applied to the partial composite textile 930 and/or the second nonwoven textile layer 114 to bond the second nonwoven textile layer 114 to the waterproof, breathable membrane 112. The result of step 942 is the composite textile 120 as shown at step 950, where the composite textile 120 comprises the first face 510 and the opposite second face 512.

At a step 952, the composite textile 120 is formed into a wearable article or an article of apparel 954. Although shown as an upper-body article of apparel, aspects herein contemplate that the composite textile 120 may be formed into other types of articles of apparel such as lower-body articles of apparel, uppers for shoes, gloves, hats, and the like. When the composite textile 120 is formed into the article of apparel 954, the first face 510 of the composite textile 120 forms an outermost-facing surface of the article of apparel 954. Properties associated with the article of apparel 744 of FIG. 7 are also applicable to the article of apparel 954 and will not be repeated herein.

The processes depicted in FIGS. 7-9 are illustrative examples and other processes are contemplated herein for forming the first composite textile 120. For example, in one example aspect, the first nonwoven textile layer 110 may be bonded to the waterproof, breathable membrane 112 as an initial step. After bonding, a durable water repellant may be deposited on the first nonwoven textile layer 110 using a padding system. After the durable water repellant deposit, the second nonwoven textile layer 114 may be bonded to the waterproof, breathable membrane, and then the colorant and chemical binder may be applied to the first side 210 of the first nonwoven textile layer 110 using a screen mesh gravure system similar to that discussed with respect to 710 of FIG. 7. As discussed above, in some aspects, high temperatures associated with the application of the colorant using the screen mesh gravure system may affect the properties of the waterproof, breathable membrane 112, but this process may be suitable with lower application temperatures.

Aspects herein further contemplate an example second composite textile that exhibits waterproof, breathable properties and includes a nonwoven textile layer making a resulting article of apparel suitable for inclement weather conditions. With respect to FIG. 10, the second composite textile may include a waterproof, breathable membrane 1010 having a first side 1012 and an opposite second side 1014. When formed into the second composite textile, the first side 1012 of the waterproof, breathable membrane 1010 forms a first face of the composite textile. The waterproof, breathable membrane 1010 may have the same properties as the waterproof, breathable membrane 112. In one example aspect, the waterproof, breathable membrane 1010 may comprises an rPU material having microperforations 1016, although aspects herein contemplate that the waterproof, breathable membrane 1010 may comprise the other materials discussed herein. In one example aspect, the waterproof, breathable membrane 1010 may have a basis weight of from about 20 gsm to about 40 gsm, from about 25 gsm to about 35 gsm, or about 30 gsm. In example aspects, the waterproof, breathable membrane 1010 may comprise a desired color or pattern imparted to the waterproof, breathable membrane 1010 when being made (i.e., the color or pattern is not added in a post-formation step).

Figures 10, 11, 12, 13:
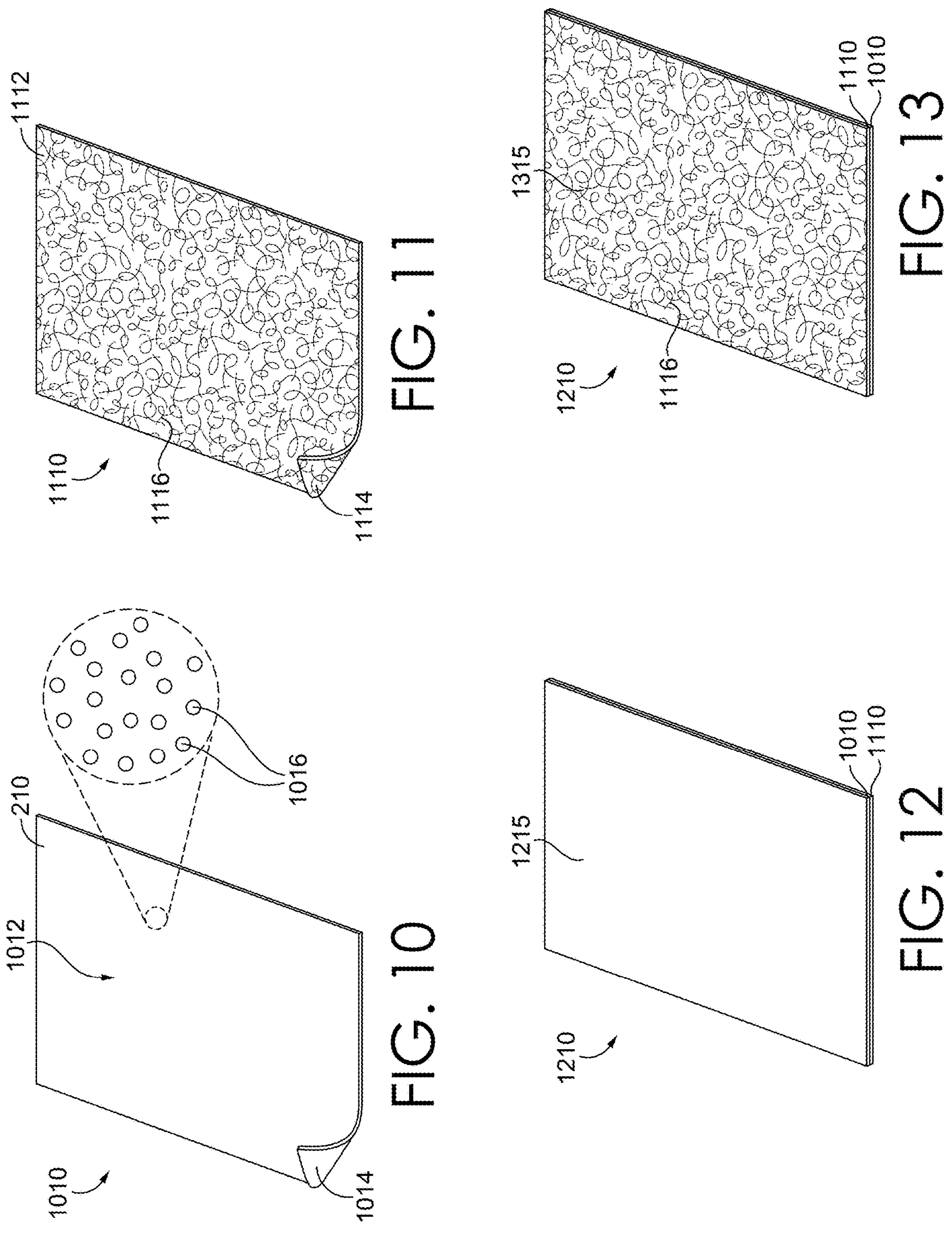
FIG. 10 illustrates a waterproof, breathable membrane for use in an example second composite textile in accordance with aspects herein.
FIG. 11 illustrates a nonwoven textile layer for use in the second composite textile in accordance with aspects herein.
FIG. 12 illustrates a first face of the second composite textile in accordance with aspects herein.
FIG. 13 illustrates an opposite second face of the second composite textile in accordance with aspects herein.

FIG. 11 depicts a nonwoven textile layer 1110 having a first side 1112 and an opposite second side 1114. When formed into the second composite textile, the first side 1112 of the nonwoven textile layer 1110 forms an opposite second face of the composite textile. The nonwoven textile layer 1110 comprises fibers and/or filaments, such as indicated by reference numeral 1116 that are entangled. In one example, the nonwoven textile layer 1110 may comprise a spunlace textile. In another example, the nonwoven textile layer 1110 may comprise a needle entangled web formed from virgin fibers, re-pelletized polymer fibers, shredded-article fibers, and any combination thereof. When in the form of a needle entangled web, the nonwoven textile layer 1110 may have a basis weight from about 50 gsm to about 100 gsm, from about 60 gsm to about 90 gsm, or from about 70 gsm to about 80 gsm.

FIG. 12 depicts a first face 1215 of a composite textile 1210 formed by bonding the waterproof, breathable membrane 1010 to the nonwoven textile layer 1110. The first face 1215 of the composite textile 1210 is formed from the first side 1012 of the waterproof, breathable membrane 1010. Because, in example aspects, the waterproof, breathable membrane 1010 comprises a film, pilling is generally not a concern and a chemical binder is generally not needed. When formed into an article of apparel, the first face 1215 of the composite textile 1210 forms an outer-facing surface, and in some aspects, an outermost-facing surface of the resulting article of apparel. In example aspects, and as discussed in relation to FIG. 14, the composite textile 1210 may include a durable water repellant deposit on the first face 1215 although this is optional in some aspects. Because of the waterproof properties of the waterproof, breathable membrane 1010, the first face 1215 of the composite textile 1210 is suitable for inclement weather conditions such as rain, sleet, or snow.

FIG. 13 depicts an opposite second face 1315 of the composite textile 1210. The second face 1315 is formed from the first side 1112 of the nonwoven textile layer 1110. When formed into an article of apparel, the second face 1315 forms an inner-facing surface, and in some aspects, an innermost-facing surface of the article of apparel. Because nonwoven textiles, especially needle entangled webs, generally have a soft hand, forming the second face 1315 from the nonwoven textile layer 1110 contributes to wearer comfort when an article of apparel formed from the composite textile 1210 is worn.

Figure 14:
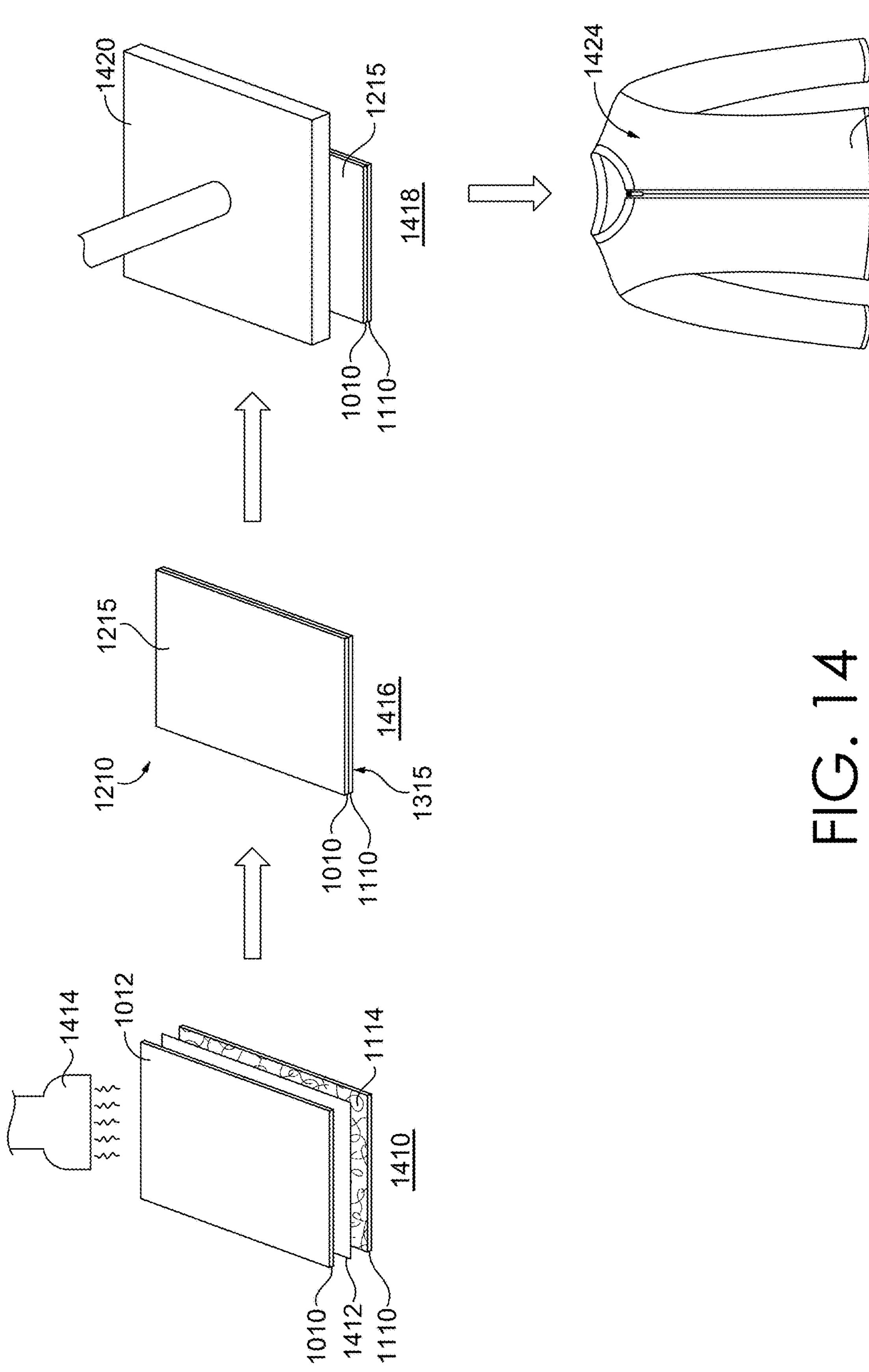
FIG. 14 illustrates an example manufacturing process for forming the second composite textile in accordance with aspects herein.

FIG. 14 is a schematic of an example process for forming the example second composite textile 1210. At a step 1410, the second side 1014 of the waterproof, breathable membrane 1010 is bonded to the nonwoven textile layer 1110. In example aspects, the bonding may be achieved through use of an adhesive film 1412 that is positioned between the second side 1014 of the waterproof, breathable membrane 1010 and the second side 1114 of the nonwoven textile layer 1110. In example aspects, the adhesive film 1412 comprises a PUR-reactive adhesive film although other types of adhesive films are contemplated herein. Aspects herein also contemplate using non-film adhesives. For example, a liquid adhesive may be applied to one or more of the waterproof, breathable membrane 1010 and/or the nonwoven textile layer 1110 before the bonding step 1410. With respect to the adhesive film 1412 in the form of a PUR-reactive adhesive, one or more of heat and pressure 1414 are applied to the waterproof, breathable membrane 1010 and/or the nonwoven textile layer 1110 to activate the adhesive film 1412 and bond the two layers together. In example aspects, the application temperature may be from about 80 degrees Celsius to about 105 degrees Celsius, from about 85 degrees Celsius to about 100 degrees Celsius, or from about 90 degrees Celsius to about 95 degrees Celsius. The result of the bonding step 1410 is the composite textile 1210 having the first face 1215 and the opposite second face 1315 as shown at step 1416.

Step 1418 depicts an optional padding step in which a padding system 1420, or other similar application systems, deposits a durable water repellant on to the first face 1215 of the composite textile 1210. In some aspects, this step may be implemented when an additional level of water protection is desired.

Step 1422 depicts a wearable article or an article of apparel 1424 formed from the composite textile 1210. As depicted, the first face 1215 of the composite textile 1210 forms an outermost-facing surface of the article of apparel 1424. The waterproof and optionally water repellant properties of the waterproof, breathable membrane make the first face 1215 suitable for exposure to rain, sleet, snow, and the like. The second face 1315 of the composite textile 1210 (not shown) formed from the nonwoven textile layer 1110 faces toward a wearer, and the soft hand of the nonwoven textile layer 1110 contributes to wearer comfort.

The second composite textile 1210 and the method of forming the composite textile as depicted in FIG. 14 may comprise fewer processing steps (e.g., no colorant and no chemical binder) compared to the first composite textile 120 which may lower the overall carbon footprint associated with the second composite textile 1210. Moreover, the second composite textile 1210 may have a lower basis weight compared to the first composite textile 120 because it comprises fewer layers making the second composite textile 1210 suitable for lighter-weight outerwear.

FIGS. 15A and 15B depict front and back views respectively of an example upper body article of apparel 1500 formed from one or more of the first composite textile 120 and/or the second composite textile 1210. The article of apparel 1500 is shown in the form of a jacket/coat but other configurations are contemplated herein including, for example, a pullover, a hoodie, a jacket/coat with a hood, a vest, and the like. The article of apparel 1500 includes a front torso portion 1510 and a back torso portion 1512 that together define a neck opening 1514 and a waist opening 1516. In example aspects, the front torso portion 1510 may include a reversible closure mechanism 1511. The article of apparel 1500 further includes a first sleeve 1518 and a second sleeve 1520.

Aspects herein contemplate that an entirety, or one or more portions of the article of apparel 1500 may be formed from the first composite textile 120 and/or the second composite textile 1210. With respect to the first composite textile 120, aspects herein contemplate that the first face 510 forms an outer-facing surface 1522 of the article of apparel 1500, and the second face 512 forms an inner-facing surface of the article of apparel 1500 (not shown in FIGS. 15A-15B). When the second composite textile 1210 forms the article of apparel 1500, aspects herein contemplate that the first face 1215 forms the outer-facing surface 1522 of the article of apparel 1500, and the second face 1315 forms the inner-facing surface of the article of apparel 1500.

When one or more portions of the article of apparel 1500 are formed from one or more of the first composite textile 120 and/or the second composite textile 1210, aspects herein contemplate that the first and/or second composite textiles 120/1210 may be positioned on portions of the article of apparel 1500 that experience a higher amount of contact with precipitation compared to other portions of the article of apparel 1500. The location of these portions may be based on rain maps of the human body. For example, the first and/or second composite textiles 120/1210 may be positioned on the shoulder regions of the article of apparel 1500, the upper back region of the article of apparel, a hood of the article of apparel 1500 (when used), and the like. Remaining portions of the article of apparel 1500 may be formed of additional nonwoven materials or other structured textiles (e.g., knit or woven textiles).

Aspects herein also contemplate forming a first portion of the article of apparel 1500 from the first composite textile 120 and other portions of the article of apparel 1500 from the second composite textile 1210. For example, since the first face 1215 of the second composite textile 1210 comprises the waterproof, breathable membrane 1010, it is generally not prone to pilling. As such, the second composite textile 1210 may be used in portions of the article of apparel 1500 that are subject to a high amount of rubbing and/or abrasion such as the area around the neck opening 1514, the area around the waist opening 1516, the elbow areas on the first and second sleeves 1518 and 1520, and the like. Remaining portions of the article of apparel 1500 may be formed of the first composite textile 120, other nonwoven textiles, and/or other structured textiles. These are illustrative examples, and aspects herein contemplate that the article of apparel 1500 may be formed of solely the first composite textile 120, solely the second composite textile 1210, any combination of the first and second composite textiles 120 and 1210, and/or any combination of the first composite textile 120 and/or the second composite textile 1210 and other nonwoven textiles and/or structured textiles.

FIGS. 16A and 16B depict front and back views respectively of an example lower body article of apparel 1600 formed from one or more of the first composite textile 120 and/or the second composite textile 1210. The article of apparel 1600 is shown in the form of a pant but aspects herein contemplate other forms including leggings, shorts, capris, a unitard, and the like. The article of apparel 1600 includes a front torso portion 1610 and a back torso portion 1612 that together define a waist opening 1614. The article of apparel 1600 further includes a first pant leg 1616 that terminates in a first pant leg opening 1618 and a second pant leg 1620 that terminates in a second pant leg opening 1622.

Aspects herein contemplate that an entirety, or one or more portions of the article of apparel 1600 may be formed from the first composite textile 120 and/or the second composite textile 1210. With respect to the first composite textile 120, aspects herein contemplate that the first face 510 forms an outer-facing surface 1624 of the article of apparel 1600, and the second face 512 forms an inner-facing surface of the article of apparel 1600 (not shown in FIGS. 16A-16B). When the second composite textile 1210 forms the article of apparel 1600, aspects herein contemplate that the first face 1215 forms the outer-facing surface 1624 of the article of apparel 1600, and the second face 1315 forms the inner-facing surface of the article of apparel 1600.

When one or more portions of the article of apparel 1600 are formed from one or more of the first composite textile 120 and/or the second composite textile 1210, aspects herein contemplate that the first and/or second composite textiles 120/1210 may be positioned on portions of the article of apparel 1600 that experience a higher amount of contact with precipitation compared to other portions of the article of apparel 1600. The location of these portions may be based on rain maps of the human body. For example, the first and/or second composite textiles 120/1210 may be positioned on the back torso portion 1612 of the article of apparel 1600, and/or around the first and second pant leg openings 1618 and 1622. Remaining portions of the article of apparel 1600 may be formed of additional nonwoven materials or other structured textiles (e.g., knit or woven textiles).

Aspects herein also contemplate forming a first portion of the article of apparel 1600 from the first composite textile 120 and other portions of the article of apparel 1600 from the second composite textile 1210. For example, since the first face 1215 of the second composite textile 1210 comprises the waterproof, breathable membrane 1010, it is generally not prone to pilling. As such, the second composite textile 1210 may be used in portions of the article of apparel 1600 that are subject to a high amount of rubbing and/or abrasion such as the back torso portion 1612 when sitting, the knee areas of the first and second pant legs 1616 and 1620, and the like. Remaining portions of the article of apparel 1600 may be formed of the first composite textile 120, other nonwoven textiles, and/or other structured textiles. These are illustrative examples, and aspects herein contemplate that the article of apparel 1600 may be formed of solely the first composite textile 120, solely the second composite textile 1210, any combination of the first and second composite textiles 120 and 1210, and/or any combination of the first composite textile 120 and/or the second composite textile 1210 and other nonwoven textiles and/or structured textiles.

FIGS. 15A, 15B, 16A, and 16B depict an upper-body garment and a lower-body garment. In at least some examples, the first composite textile 120, the second composite textile 1210, any other composite textile described herein, and any combination thereof, can comprise at least a portion of a footwear article (e.g., an upper for a footwear article).

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A composite textile having a first face and an opposite second face, the composite textile comprising: a first nonwoven textile layer having a first side and an opposite second side, the first side of the first nonwoven textile layer comprising the first face of the composite textile, the first nonwoven textile layer comprising a durable water repellant deposit; a waterproof, breathable membrane; and a first adhesive layer positioned between the waterproof, breathable membrane and the second side of the first nonwoven textile layer, the first adhesive layer bonding the waterproof, breathable membrane to the first nonwoven textile layer.

Clause 2. The composite textile according to clause 1, wherein the first nonwoven textile layer comprises a printed component.

Clause 3. The composite textile according to clause 2, wherein the printed component comprises at least one of a colorant and a sublimation dye.

Clause 4. The composite textile according to any of clauses 1 through 3, wherein the first nonwoven textile layer comprises a plurality of chemical bonding sites.

Clause 5. The composite textile according to clause 4, wherein one or more of fibers and filaments of the first nonwoven textile layer are adhered together at the plurality of chemical bonding sites.

Clause 6. The composite textile according to any of clauses 1 through 5, wherein the first nonwoven textile layer comprises a spunlace textile.

Clause 7. The composite textile according to any of clauses 1 through 5, wherein the first nonwoven textile layer comprises one or more of entangled staple fibers having a generally uniform length and entangled fibers having different lengths.

Clause 8. The composite textile according to any of clauses 1 through 5, wherein the first nonwoven textile layer comprises one or more of fibers derived from a shredded-article fiber source, re-pelletized polymer fibers, and virgin fibers.

Clause 9. The composite textile according to any of clauses 1 through 5, wherein the first nonwoven textile layer comprises from about 10% to about 100% of fibers derived from a shredded-article fiber source and having varied lengths.

Clause 10. The composite textile according to clause 1, wherein the waterproof, breathable membrane comprises a polymer.

Clause 11. The composite textile according to clause 10, wherein the polymer comprises an olefin.

Clause 12. The composite textile according to clause 11, wherein the olefin comprises a polyolefin.

Clause 13. The composite textile according to clause 12, wherein the polyolefin comprises polyethylene or polypropylene.

Clause 14. The composite textile according to clause 10, wherein the polymer comprises polyurethane.

Clause 15. The composite textile according to clause 10, wherein the polymer comprises a thermoplastic polymer.

Clause 16. The composite textile according to clause 15, wherein the thermoplastic polymer comprises a thermoplastic elastomer.

Clause 17. The composite textile according to clause 10, wherein the polymer comprises a recycled polymer.

Clause 18. The composite textile according to clause 10, wherein the polymer comprises one or more of recycled polyurethane, thermoplastic polyurethane, recycled thermoplastic polyether ester elastomer, or recycled polytetrafluoroethylene.

Clause 19. The composite textile according to any of clauses clause 1 through 18, wherein the first adhesive layer comprises a polyurethane-reactive adhesive.

Clause 20. The composite textile according to any of clauses 1 through 19, further comprising: a second nonwoven textile layer having a first side and an opposite second side, the first side of the second nonwoven textile layer comprising the second face of the composite textile; and a second adhesive layer positioned between the waterproof, breathable membrane and the second side of the second nonwoven textile layer, the second adhesive layer bonding the waterproof, breathable membrane to the second nonwoven textile layer.

Clause 21. The composite textile according to clause 20, wherein the second nonwoven textile layer comprises a spunlace textile.

Clause 22. The composite textile according to clause 20, wherein the second nonwoven textile layer comprises one or more of entangled staple fibers having a uniform length and entangled fibers having different lengths.

Clause 23. The composite textile according to any of clauses 20 through 22, wherein the second adhesive layer comprises a polyurethane-reactive adhesive.

Clause 24. A wearable article having an outer-facing surface and an opposite inner-facing surface, the wearable article comprising: a first nonwoven textile layer having a first side and an opposite second side, the first side of the first nonwoven textile layer comprising the outer-facing surface of the wearable article, the first nonwoven textile layer comprising a durable water repellant deposit; a waterproof, breathable membrane; and a first adhesive layer positioned between the waterproof, breathable membrane and the second side of the first nonwoven textile layer, the first adhesive layer bonding the waterproof, breathable membrane to the first nonwoven textile layer.

Clause 25. The wearable article according to clause 24, wherein the first nonwoven textile layer comprises a printed component.

Clause 26. The wearable article according to clause 25, wherein the printed component comprises at least one of a colorant and a sublimation dye.

Clause 27. The wearable article according to any of clauses 24 through 26, wherein the first nonwoven textile layer comprises a plurality of chemical bonding sites.

Clause 28. The wearable article according to clause 27, wherein one or more of fibers and filaments of the first nonwoven textile layer are adhered together at the plurality of chemical bonding sites.

Clause 29. The wearable article according to any of clauses 24 through 28, wherein the first nonwoven textile layer comprises a spunlace textile.

Clause 30. The wearable article according to any of clauses 24 through 28, wherein the first nonwoven textile layer comprises one or more of entangled staple fibers having a generally uniform length and entangled fibers having different lengths.

Clause 31. The wearable article according to any of clauses 24 through 30, wherein the waterproof, breathable membrane comprises one selected from: recycled polyurethane, thermoplastic polyurethane, recycled thermoplastic polyether ester elastomer, or recycled polytetrafluoroethylene.

Clause 32. The wearable article according to any of clauses 24 through 31, wherein the first adhesive layer comprises a polyurethane-reactive adhesive.

Clause 33. The wearable article according to any of clauses 24 through 32, further comprising: a second nonwoven textile layer having a first side and an opposite second side, the first side of the second nonwoven textile layer comprising the inner-facing surface of the wearable article; and a second adhesive layer positioned between the waterproof, breathable membrane and the second side of the second nonwoven textile layer, the second adhesive layer bonding the waterproof, breathable membrane to the second nonwoven textile layer.

Clause 34. The wearable article according to clause 33, wherein the second nonwoven textile layer comprises a spunlace textile.

Clause 35. The wearable article according to clause 33, wherein the second nonwoven textile layer comprises one or more of entangled staple fibers having a uniform length and entangle fibers having a varied length.

Clause 36. The wearable article according to any of clauses 33 through 35, wherein the second adhesive layer comprises a polyurethane-reactive adhesive.

Clause 37. A method of forming a composite textile having a first face and an opposite second face, the method comprising: positioning a first adhesive between a first nonwoven textile layer and a waterproof, breathable membrane, the first nonwoven textile layer comprising a first side and an opposite second side, wherein the first adhesive is positioned adjacent the second side of the first nonwoven textile layer; applying one or more of heat and pressure to the first adhesive to bond the first nonwoven textile layer to the waterproof, breathable membrane, wherein subsequent to bonding, the first side of the first nonwoven textile layer comprises the first face of the composite textile; and depositing a durable water repellant on to the first nonwoven textile layer.

Clause 37, wherein the first adhesive is a film.

Clause 37, wherein the first adhesive is applied in a dot-lamination process.

Clause 37, wherein the first adhesive is applied as a liquid adhesive.

Clause 38. The method of forming the composite textile according to clause 37, wherein the durable water repellant is deposited on to the first nonwoven textile layer subsequent to bonding the first nonwoven textile layer to the waterproof, breathable membrane.

Clause 39. The method of forming the composite textile according to any of clauses 37 through 38, further comprising applying a printed component to the first nonwoven textile layer.

Clause 40. The method of forming the composite textile according to clause 39, wherein the printed component is applied to the first nonwoven textile layer prior to bonding the first nonwoven textile layer to the waterproof, breathable membrane.

Clause 41. The method of forming the composite textile according to any of clauses 39 through 40, wherein the printed component comprises a colorant.

Clause 42. The method of forming the composite textile according to clause 41, wherein the colorant includes a chemical binder, and wherein application of the colorant to the first nonwoven textile layer creates a plurality of chemical bonding sites.

Clause 43. The method of forming the composite textile according to clause 42, wherein one or more of fibers and filaments of the first nonwoven textile layer are adhered together at the plurality of chemical bonding sites.

Clause 44. The method of forming the composite textile according to any of clauses 37 through 40, wherein the printed component comprises a sublimation dye.

Clause 45. The method of forming the composite textile according to clause 44, further comprising applying a chemical binder to the first nonwoven textile layer to create a plurality of chemical bonding sites.

Clause 46. The method of forming the composite textile according to clause 45, wherein the chemical binder is applied to the first nonwoven textile layer prior to depositing the durable water repellant on to the first nonwoven textile layer.

Clause 47. The method of forming the composite textile according to any of clauses 45 through 46, wherein the chemical binder is applied to the first nonwoven textile layer subsequent to bonding the first nonwoven textile layer to the waterproof, breathable membrane.

Clause 48. The method of forming the composite textile according to any of clauses 45 through 47, wherein one or more fibers and filaments of the first nonwoven textile layer are adhered together at the plurality of chemical bonding sites.

Clause 49. The method of forming the composite textile according to any of clauses 37 through 48, wherein the first nonwoven textile layer is a spunlace textile.

Clause 50. The method of forming the composite textile according to any of clauses 37 through 48, wherein the first nonwoven textile layer comprises one or more of entangled staple fibers having a generally uniform length and entangled fibers having different lengths.

Clause 51. The method forming the composite textile according to any of clauses 37 through 50, the waterproof, breathable membrane comprises one selected from: recycled polyurethane, thermoplastic polyurethane, recycled thermoplastic polyether ester elastomer, or recycled polytetrafluoroethylene.

Clause 52. The method of forming the composite textile according to any of clauses 37 through 51, wherein the first adhesive film comprises a polyurethane-reactive adhesive.

Clause 53. The method of forming the composite textile according to any of clauses 37 through 52, further comprising: positioning a second adhesive film between a second nonwoven textile layer and the waterproof, breathable membrane, the second nonwoven textile layer comprising a first side and an opposite second side, wherein the second adhesive film is positioned adjacent the second side of the second nonwoven textile layer; and applying one or more of heat and pressure to the second adhesive film to bond the second nonwoven textile layer to the waterproof, breathable membrane, wherein subsequent to bonding, the first side of the second nonwoven textile layer comprises the second face of the composite textile.

Clause 54. The method according to clause 53, wherein the second nonwoven textile layer is bonded to the waterproof, breathable membrane after the durable water repellant is deposited on to the first nonwoven textile layer.

Clause 55. The method of forming the composite textile according to any of clauses 53 through 54, wherein the second nonwoven textile layer comprises a spunlace textile.

Clause 56. The method of forming the composite textile according to any of clauses 53 through 54, wherein the second nonwoven textile layer comprises one or more of entangled staple fibers having a generally uniform length and entangled fibers having different lengths.

Clause 57. The method of forming the composite textile according to any of clauses 53 through 56, wherein the second adhesive film comprises a polyurethane-reactive adhesive.

Clause 58. The method of forming the composite textile according to any of clauses 53 through 57, further comprising forming the composite textile into an article of apparel, wherein the first face of the composite textile forms an outer-facing surface of the article of apparel, and wherein the second face of the composite textile forms an inner-facing surface of the article of apparel.

Clause 59. A composite textile having a first face and an opposite second face, the composite textile comprising: a first nonwoven textile layer having a first side and an opposite second side, the first side of the first nonwoven textile layer comprising the first face of the composite textile, the first nonwoven textile layer comprising a durable water repellant deposit; and a waterproof, breathable membrane bonded to the second side of the first nonwoven textile layer.

Clause 59, wherein the first nonwoven textile comprises a supercritical $CO_2$ impregnated colorant, which comprises a dye or a pigment.

Clause 60. The composite textile according to clause 59, further comprising a first adhesive layer positioned between the second side of the first nonwoven textile layer and the waterproof, breathable membrane, the first adhesive layer bonding the first nonwoven textile layer to the waterproof, breathable membrane.

Clause 61. The composite textile according to any of clauses 59 through 60, wherein the first nonwoven textile layer comprises a printed component.

Clause 62. The composite textile according to clause 61, wherein the printed component includes at least one of a colorant and a sublimation dye.

Clause 63. The composite textile according to any of clauses 59 through 62, wherein the first nonwoven textile layer comprises a plurality of chemical bonding sites.

Clause 64. The composite textile according to clause 63, wherein one or more of fibers and filaments of the first nonwoven textile layer are adhered together at the plurality of chemical bonding sites.

Clause 65. The composite textile according to any of clauses 59 through 64, wherein the first nonwoven textile layer comprises a spunlace textile.

Clause 66. The composite textile according to any of clauses 59 through 64, wherein the first nonwoven textile layer comprises one or more of entangled staple fibers having a generally uniform length and entangled fibers having different lengths.

Clause 67. The composite textile according to any of clauses 59 through 66, wherein the waterproof, breathable membrane comprises one selected from: recycled polyurethane, thermoplastic polyurethane, recycled thermoplastic polyether ester elastomer, or recycled polytetrafluoroethylene.

Clause 68. The composite textile according to any of clauses 59 through 67, further comprising a second nonwoven textile layer having a first side and an opposite second side, the first side of the second nonwoven textile layer comprising the second face of the composite textile, the second side of the second nonwoven textile layer bonded to the waterproof, breathable membrane.

Clause 69. The composite textile according to clause 68, further comprising a second adhesive layer positioned between the second side of the second nonwoven textile layer and the waterproof, breathable membrane, the second adhesive layer bonding the second nonwoven textile layer to the waterproof, breathable membrane.

Clause 70. The composite textile according to any of clauses 68 through 69, wherein the second nonwoven textile layer comprises a spunlace textile.

Clause 71. The composite textile according to any of clauses 68 through 69, wherein the second nonwoven textile layer comprises one or more of entangled staple fibers having a generally uniform length and entangled fibers having different lengths.

Clause 72. An article of apparel having an outer-facing surface and an opposite inner-facing surface, the article of apparel comprising: a first nonwoven textile layer having a first side and an opposite second side, the first side of the first nonwoven textile layer comprising the outer-facing surface of the article of apparel, the first nonwoven textile layer comprising a durable water repellant deposit; and a waterproof, breathable membrane bonded to the second side of the first nonwoven textile layer.

Clause 73. The article of apparel according to clause 72, further comprising a first adhesive layer positioned between the second side of the first nonwoven textile layer and the waterproof, breathable membrane, the first adhesive layer bonding the first nonwoven textile layer to the waterproof, breathable membrane.

Clause 74. The article of apparel according to any of clauses 72 through 73, wherein the first nonwoven textile layer comprises a printed component.

Clause 75. The article of apparel according to clause 74, wherein the printed component includes at least one of a colorant and a sublimation dye.

Clause 75, wherein the colorant comprises a supercritical $CO_2$ colorant, which comprises a dye or a pigment; and/or wherein the first nonwoven layer is fully colored across a substantial entirety of the first side.

Clause 76. The article of apparel according to any of clauses 72 through 75, wherein the first nonwoven textile layer comprises a plurality of chemical bonding sites.

Clause 77. The article of apparel according to clause 77, wherein one or more of fibers and filaments of the first nonwoven textile layer are adhered together at the plurality of chemical bonding sites.

Clause 78. The article of apparel according to any of clauses 72 through 77, wherein the first nonwoven textile layer comprises a spunlace textile.

Clause 79. The article of apparel according to any of clauses 72 through 77, wherein the first nonwoven textile layer comprises one or more of entangled staple fibers having a generally uniform length and entangled fibers having different lengths.

Clause 80. The article of apparel according to any of clauses 72 through 79, wherein the waterproof, breathable membrane comprises one selected from: recycled polyurethane, thermoplastic polyurethane, recycled thermoplastic polyether ester elastomer, or recycled polytetrafluoroethylene.

Clause 81. The article of apparel according to any of clauses 72 through 80, further comprising: a second nonwoven textile layer having a first side and an opposite second side, the first side of the second nonwoven textile layer comprising the inner-facing surface of the article of apparel, the second side of the second nonwoven textile layer bonded to the waterproof, breathable membrane.

Clause 82. The article of apparel according to clause 81, further comprising a second adhesive layer positioned between the second side of the second nonwoven textile layer and the waterproof, breathable membrane, the second adhesive layer bonding the second nonwoven textile layer to the waterproof, breathable membrane.

Clause 83. The article of apparel according to any of clauses 81 through 82, wherein the second nonwoven textile layer comprises a spunlace textile.

Clause 84. The article of apparel according to any of clauses 81 through 82, wherein the second nonwoven textile layer comprises one or more of entangled staple fibers having a generally uniform length and entangled fibers having different lengths.

Clause 85. A method of forming a composite textile having a first face and an opposite second face, the method comprising: bonding a waterproof, breathable membrane to a first nonwoven textile layer, the first nonwoven textile layer comprising a first side and an opposite second side, the first side forming the first face of the composite textile, the second side being bonded to the waterproof, breathable membrane; and depositing a durable water repellant on to the first nonwoven textile layer.

Clause 86. The method of forming the composite textile according to clause 85, wherein the durable water repellant is deposited on to the first nonwoven textile layer subsequent to bonding the waterproof, breathable membrane to the first nonwoven textile layer.

Clause 87. The method of forming the composite textile according to any of clauses 85 through 86, further comprising applying a printed component to the first nonwoven textile layer.

Clause 88. The method of forming the composite textile according to clause 87, wherein the printed component is applied to the first nonwoven textile layer prior to bonding the waterproof, breathable membrane to the first nonwoven textile layer.

Clause 89. The method of forming the composite textile according to any of clauses 87 through 88, wherein the printed component comprises a colorant.

Clause 90. The method of forming the composite textile according to clause 89, wherein the colorant includes a chemical binder, and wherein application of the colorant to the first nonwoven textile layer creates a plurality of chemical bonding sites.

Clause 91. The method of forming the composite textile according to clause 90, wherein one or more of fibers and filaments of the first nonwoven textile layer are adhered together at the plurality of chemical bonding sites.

Clause 92. The method of forming the composite textile according to any of clauses 87 through 88, wherein the printed component comprises a sublimation dye.

Clause 93. The method of forming the composite textile according to clause 92, further comprising applying a chemical binder to the first nonwoven textile layer to create a plurality of chemical bonding sites.

Clause 94. The method of forming the composite textile according to clause 93, wherein the chemical binder is applied to the first nonwoven textile layer prior to depositing the durable water repellant on to the first nonwoven textile layer.

Clause 95. The method of forming the composite textile according to any of clauses 93 through 94, wherein the chemical binder is applied to the first nonwoven textile layer subsequent to bonding the waterproof, breathable membrane to the first nonwoven textile layer.

Clause 96. The method of forming the composite textile according to any of clauses 93 through 95, wherein one or more fibers and filaments of the first nonwoven textile layer are adhered together at the plurality of chemical bonding sites.

Clause 97. The method of forming the composite textile according to any of clauses 85 through 96, wherein the first nonwoven textile layer is a spunlace textile.

Clause 98. The method of forming the composite textile according to any of clauses 85 through 96, wherein the first nonwoven textile layer comprises one or more of entangled staple fibers having a generally uniform length and entangled fibers having different lengths.

Clause 99. The method forming the composite textile according to any of clauses 85 through 98, the waterproof, breathable membrane comprises one selected from: recycled polyurethane, thermoplastic polyurethane, recycled thermoplastic polyether ester elastomer, or recycled polytetrafluoroethylene.

Clause 100. The method of forming the composite textile according to any of clauses 85 through 99, further comprising bonding the waterproof, breathable membrane to a second nonwoven textile layer, the second nonwoven textile layer comprising a first side and an opposite second side, the first side of the second nonwoven textile layer forming the second face of the composite textile, the second side of the second nonwoven textile layer being bonded to the waterproof, breathable membrane.

Clause 101. The method of forming the composite textile according to clause 100, wherein the second nonwoven textile layer comprises a spunlace textile.

Clause 102. The method of forming the composite textile according to clause 100, wherein the second nonwoven textile layer comprises one or more of entangled staple fibers having a generally uniform length and entangled fibers having different lengths.

Clause 103. The method of forming the composite textile according to any of clauses 100 through 102, further comprising forming the composite textile into an article of apparel, wherein the first face of the composite textile forms an outer-facing surface of the article of apparel, and wherein the second face of the composite textile forms an inner-facing surface of the article of apparel.

Clause 104. A composite textile having a first face and an opposite second face, the composite textile comprising: a waterproof, breathable membrane having a first side and an opposite second side, the first side comprising the first face of the composite textile, the waterproof, breathable membrane comprising a durable water repellant deposit; and a nonwoven textile layer bonded to the second side of the waterproof, breathable membrane, the nonwoven textile layer comprising the second face of the composite textile.

Clause 105. The composite textile according to clause 104, further comprising an adhesive layer positioned between the waterproof, breathable membrane and the nonwoven textile layer, the adhesive layer bonding the waterproof, breathable membrane to the nonwoven textile layer.

Clause 106. The composite textile according to any of clauses 104 through 105, wherein the nonwoven textile layer comprises a spunlace textile.

Clause 107. The composite textile according to any of clauses 104 through 105, wherein the nonwoven textile layer comprises one or more of entangled staple fibers having a generally uniform length and entangled fibers having different lengths.

Clause 108. The composite textile according to any of clauses 104 through 107, wherein the waterproof, breathable membrane comprises one selected from: recycled polyurethane, thermoplastic polyurethane, recycled thermoplastic polyether ester elastomer, or recycled polytetrafluoroethylene.

Clause 109. An article of apparel formed from the composite textile of clause 104, wherein the first face of the composite textile comprises an outer-facing surface of the article of apparel, and wherein the second face of the composite textile comprises an inner-facing surface of the article of apparel.

Clause 110. A method of forming a composite textile having a first face and an opposite second face, the method comprising: bonding a waterproof, breathable membrane to a nonwoven textile layer, the waterproof, the waterproof, breathable membrane comprising the first face of the composite textile, the nonwoven textile layer comprising the second face of the composite textile; and depositing a durable water repellant on to the waterproof, breathable membrane.

Clause 111. The method of forming the composite textile according to clause 110, wherein an adhesive film is used to bond the waterproof, breathable membrane to the nonwoven textile layer.

Clause 112. The method of forming the composite textile according to any of clauses 110 through 111, wherein the nonwoven textile layer comprises a spunlace textile.

Clause 113. The method of forming the composite textile according to any of clauses 110 through 112, wherein the nonwoven textile layer comprises one or more of entangled staple fibers having a generally uniform length and entangled fibers having different lengths.

Clause 114. The method of forming the composite textile according to any of clauses 110 through 113, wherein the waterproof, breathable membrane comprises one selected from: recycled polyurethane, thermoplastic polyurethane, recycled thermoplastic polyether ester elastomer, or recycled polytetrafluoroethylene.

Clause 115. The method of forming the composite textile according to any of clauses 110 through 114, further comprising forming the composite textile into an article of apparel, wherein the first face of the composite textile forms an outer-facing surface of the article of apparel, and wherein the second face of the composite textile forms an inner-facing surface of the article of apparel.

Clause 116. A composite textile comprising a first face and an opposite second face, the composite textile comprising: a first nonwoven textile layer having a first side and an opposite second side, the first side of the first nonwoven textile layer comprising the first face of the composite textile, the first nonwoven textile layer comprising a printed component; a waterproof, breathable membrane; and a first adhesive layer positioned between the waterproof, breathable membrane and the second side of the first nonwoven textile layer, the first adhesive layer bonding the waterproof, breathable membrane to the first nonwoven textile layer.

Clause 117. The composite textile according to clause 116, wherein the printed component comprises at least one of a colorant and a sublimation dye.

Clause 118. The composite textile according to any of clauses 116 through 117, wherein the first nonwoven textile layer comprises a durable water repellant deposit.

Clause 119. The composite textile according to any of clauses 116 through 118, wherein the first nonwoven textile layer comprises a plurality of chemical bonding sites.

Clause 120. The composite textile according to clause 119, wherein one or more of fibers and filaments of the first nonwoven textile layer are adhered together at the plurality of chemical bonding sites.

Clause 121. The composite textile according to any of clauses 116 through 120, wherein the first nonwoven textile layer comprises a spunlace textile.

Clause 122. The composite textile according to any of clauses 116 through 120, wherein the first nonwoven textile layer comprises one or more of entangled staple fibers having a generally uniform length and entangled fibers having different lengths.

Clause 123. The composite textile according to any of clauses 116 through 122, wherein the waterproof, breathable membrane comprises one selected from: recycled polyurethane, thermoplastic polyurethane, recycled thermoplastic polyether ester elastomer, or recycled polytetrafluoroethylene.

Clause 124. The composite textile according to any of clauses 116 through 123, wherein the first adhesive layer comprises a polyurethane-reactive adhesive.

Clause 125. The composite textile according to any of clauses 116 through 124, further comprising: a second nonwoven textile layer having a first side and an opposite second side, the first side of the second nonwoven textile layer comprising the second face of the composite textile; and a second adhesive layer positioned between the waterproof, breathable membrane and the second side of the second nonwoven textile layer, the second adhesive layer bonding the waterproof, breathable membrane to the second nonwoven textile layer.

Clause 126. The composite textile according to clause 125, wherein the second nonwoven textile layer comprises a spunlace textile.

Clause 127. The composite textile according to clause 125, wherein the second nonwoven textile layer comprises one or more of entangled staple fibers having a generally uniform length and entangled fibers having different lengths.

Clause 128. The composite textile according to any of clauses 125 through 127, wherein the second adhesive layer comprises a polyurethane-reactive adhesive.

Clause 129. An article of apparel formed from the composite textile of clause 125, wherein the first face of the composite textile comprises an outer-facing surface of the article of apparel, and wherein the second face of the composite textile comprises an inner-facing surface of the article of apparel.

Clause 130. A composite nonwoven textile having a first face and an opposite second face, the composite nonwoven textile comprising: a waterproof, breathable membrane positioned between and bonded to a first nonwoven textile layer and a second nonwoven textile layer, the composite nonwoven textile having: a basis weight from about 100 grams per square meter (gsm) to about 180 gsm; a resistance to vapor transport (RET) from about 12 RET to about 22 RET; and a resistance to water penetration from about 9000 mm to about 1200 mm.

Clause 131. The composite nonwoven textile according to clause 130, wherein the composite nonwoven textile comprises a water repellency of from about 3 to about 4.5.

Clause 132. The composite nonwoven textile according to any of clauses 130 through 131, wherein the composite nonwoven textile has a pilling resistance of from about 3 to about 3.5.

Clause 133. The composite nonwoven textile according to any of clauses 130 through 132, wherein the first nonwoven textile layer comprises the first face of the composite nonwoven textile, and wherein the second nonwoven textile layer comprises the second face of the composite nonwoven textile.

Clause 134. An article of apparel formed from the composite textile of clause 130, wherein the first face of the composite textile comprises an outer-facing surface of the article of apparel, and wherein the second face of the composite textile comprises an inner-facing surface of the article of apparel.

Clause 135. A composite textile having a first face and an opposite second face, the composite textile comprising: a first nonwoven textile layer having a first side and an opposite second side, the first side of the first nonwoven textile layer comprising the first face of the composite textile; a second nonwoven textile layer having a first side and an opposite second side, the first side of the second nonwoven textile layer comprising the second face of the composite textile; and a waterproof, breathable membrane bonded between the first nonwoven textile layer and the second nonwoven textile layer.

Clause 136. The composite textile according to clause 135, wherein the first nonwoven textile layer comprises a durable water repellant deposit.

Clause 137. The composite textile according to any of clauses 135 through 136, wherein the first nonwoven textile layer comprises a printed component.

Clause 138. The composite textile according to clause 137, wherein the printed component comprises at least one of a colorant and a sublimation dye.

Clause 139. The composite textile according to any of clauses 135 through 138, further comprising, a first adhesive layer positioned between the first nonwoven textile layer and the waterproof, breathable membrane and a second adhesive layer positioned between the second nonwoven textile layer and the waterproof, breathable membrane.

Clause 140. The composite textile according to any of clauses 135 through 139, wherein the first nonwoven textile layer comprises a plurality of chemical bonding sites.

Clause 141. The composite textile according to clause 140, wherein one or more of fibers and filaments of the first nonwoven textile layer are adhered together at the plurality of chemical bonding sites.

Clause 142. The composite textile according to any of clauses 135 through 141, wherein the waterproof, breathable membrane comprises a polymer.

Clause 143. The composite textile according to clause 142, wherein the polymer comprises an olefin.

Clause 144. The composite textile according to clause 143, wherein the olefin comprises a polyolefin.

Clause 145. The composite textile according to clause 144, wherein the polyolefin comprises polyethylene or polypropylene.

Clause 146. The composite textile according to clause 142, wherein the polymer comprises polyurethane.

Clause 147. The composite textile according to clause 142, wherein the polymer comprises a thermoplastic polymer.

Clause 148. The composite textile according to clause 147, wherein the thermoplastic polymer comprises a thermoplastic elastomer.

Clause 149. The composite textile according to clause 142, wherein the polymer comprises a recycled polymer.

Clause 150. The composite textile according to clause 142, wherein the polymer comprises one or more of recycled polyurethane, thermoplastic polyurethane, recycled thermoplastic polyether ester elastomer, or recycled polytetrafluoroethylene.

Clause 151. The composite textile according to any of clauses 135 through 150, wherein the first nonwoven textile layer comprises a first spunlace nonwoven textile and the second nonwoven textile layer comprises a second spunlace nonwoven textile.

Clause 152. The composite textile according to any of clauses 135 through 150, wherein the first nonwoven textile layer comprises a spunlace nonwoven textile and the second nonwoven textile layer comprises entangled fibers.

Clause 153. The composite textile according to any of clauses 135 through 150, wherein the first nonwoven textile layer comprises a first web of entangled fibers and the second nonwoven textile layer comprises a second web of entangled fibers.

Clause 154. A wearable article comprising the composite textile of clause 135.

Clause 155. The wearable article according to clause 154, wherein the wearable article comprises an upper-body garment, a lower-body garment, a footwear article, headwear, gloves, or sleeves.

Clause 156. The wearable article according to clause 154, wherein the wearable article comprises an upper for a footwear article.

Clause 157. A composite textile having a first face and an opposite second face, the composite textile comprising: a first nonwoven textile layer having a first side and an opposite second side, the first side of the first nonwoven textile layer comprising the first face of the composite textile, the first nonwoven textile layer comprising one or more of a durable water repellant finish and a plurality of chemical bonding sites; wherein the first nonwoven textile layer comprises one or more entangled webs of fibers.

Clause 158. The composite textile according to clause 157, wherein at least one of the one or more entangled webs of fibers comprises re-pelletized polymer fibers and shredded-article fibers.

Clause 159. The composite textile according to any of clauses 157 through 158, further comprising a waterproof, breathable membrane comprising a thermoplastic polymer.

Clause 160. The composite textile according to any of clauses 157 through 159, wherein an amount of surface area of the first nonwoven textile layer occupied by the plurality of chemical bonding sites is between about 40% to about 60%.

Clause 161. A composite textile having a first face and an opposite second face, the composite textile comprising: a first nonwoven textile layer having a first side and an opposite second side, the first side of the first nonwoven textile layer comprising the first face of the composite textile, the first nonwoven textile layer comprising a durable water repellant deposit; and a waterproof, breathable membrane; wherein the first nonwoven textile layer is bonded to the waterproof, breathable membrane, and wherein the first nonwoven textile layer includes one or more of shredded-article fibers and re-pelletized polymer fibers.

Clause 162. A composite textile comprising a first face and an opposite second face, the composite textile comprising: a first nonwoven textile layer having a first side and an opposite second side, the first side of the first nonwoven textile layer comprising the first face of the composite textile, the first nonwoven textile layer comprising supercritical $CO_2$ impregnated dye; a waterproof, breathable membrane; and a first adhesive layer positioned between the waterproof, breathable membrane and the second side of the first nonwoven textile layer, the first adhesive layer bonding the waterproof, breathable membrane to the first nonwoven textile layer.

Clause 163. The composite textile of clause 162, wherein the first nonwoven textile layer comprises a chemical binder.

Clause 164. The composite textile of clause 162 or clause 163, wherein the first nonwoven textile layer comprises a DWR finish.

Clause 165. The composite textile of any of clauses 162 to 164, wherein the first nonwoven textile layer comprises a spunlace textile.

Clause 166. The composite textile of any of clauses 162 to 165 further comprising, a second nonwoven textile layer bonded, via a second adhesive layer, to the waterproof, breathable membrane.

Clause 167. The composite textile of clause 166, wherein the second nonwoven textile comprises a spunlace textile.

Clause 168. The composite textile of clause 166, wherein the second nonwoven textile comprises a spunbond scrim.

Clause 169. The composite textile of any of clauses 162 to 165, wherein the opposite second face of the composite textile comprises a printed component.

Clause 170. The composite textile of any of clauses 162 to 169, wherein the first face of the composite textile comprises an outer-facing surface of an apparel article.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A composite textile having a first face and an opposite second face, the composite textile comprising:

a first nonwoven textile layer having a first side and an opposite second side, the first side of the first nonwoven textile layer comprising the first face of the composite textile, the first nonwoven textile layer comprising a durable water repellant deposit; and a waterproof, breathable membrane bonded to the second side of the first nonwoven textile layer, wherein the composite textile comprises a portion of an apparel article; wherein the first face comprises an outer-facing surface of the apparel article and the opposite second face comprises an inner-facing surface of the apparel article; and wherein the inner-facing surface comprises an inner face of the waterproof, breathable membrane and comprises a material-deposit layer coupled directly to the inner face of the waterproof, breathable membrane.

2. The composite textile of claim 1, further comprising a first adhesive layer positioned between the second side of the first nonwoven textile layer and the waterproof, breathable membrane, the first adhesive layer bonding the first nonwoven textile layer to the waterproof, breathable membrane.

3. The composite textile of claim 1, wherein the first nonwoven textile layer comprises a printed component.

4. The composite textile of claim 3, wherein the printed component comprises a supercritical $CO_2$ impregnated dye.

5. The composite textile of claim 1, wherein the first nonwoven textile layer comprises a plurality of chemical bonding sites.

6. The composite textile of claim 1, wherein the first nonwoven textile layer comprises a spunlace textile.

7. The composite textile of claim 1, wherein the waterproof, breathable membrane comprises a film comprising recycled polyurethane, thermoplastic polyurethane, recycled thermoplastic ester elastomer, polyether or recycled polytetrafluoroethylene.

8. The composite textile of claim 1, wherein the material-deposit layer comprises a pattern.

9. The composite textile of claim 1, wherein the material-deposit layer reduces cling associated with the inner face of the waterproof, breathable membrane.

10. The composite textile of claim 1, wherein the material-deposit layer comprises discontinuous deposits of material arranged in a pattern.

11. The composite textile of claim 6, wherein the spunlace textile comprises cross-lapped fibers.

12. The composite textile of claim 1, wherein the apparel article comprises an upper-body garment, a lower-body garment, or a footwear article.

13. An apparel article comprising:

a composite textile comprising a first face and an opposite second face, wherein the first face comprises an outer-facing surface of the apparel article and the opposite second face comprises an inner-facing surface of the apparel article; and wherein the composite textile comprises:

a nonwoven textile layer comprising a first side and an opposite second side, wherein the first side of the nonwoven textile layer comprises the first face of the composite textile; wherein the nonwoven textile layer comprises a durable water repellant deposit; and wherein the nonwoven textile layer comprises a spunlace textile that comprises cross-lapped fibers; and a waterproof, breathable membrane bonded to the second side of the nonwoven textile layer, wherein the waterproof, breathable membrane comprises the opposite second face of the composite textile.

14. The apparel article of claim 13, wherein the apparel article comprises an upper-body garment, a lower-body garment, or a footwear article.

15. The apparel article of claim 13, wherein a material-deposit layer is attached directly to the waterproof, breathable membrane.

16. The apparel article of claim 15, wherein the material-deposit layer comprises discontinuous deposits of material arranged in a pattern.

17. The apparel article of claim 16, wherein the discontinuous deposits of material comprise a first color.

18. The apparel article of claim 17, wherein the waterproof, breathable membrane comprises a second color, which is different from the first color.

19. The apparel article of claim 17, wherein the discontinuous deposits of material impart the first color to the waterproof, breathable membrane.

* * * * *